(12) United States Patent
Shintani et al.

(10) Patent No.: US 8,502,878 B2
(45) Date of Patent: Aug. 6, 2013

(54) IMAGING APPARATUS HAVING A CHANGEABLE OPERATING MODE RESPONSIVE TO AN INCLINED ORIENTATION

(75) Inventors: Koichi Shintani, Hachioji (JP); Katsuhisa Kawaguchi, Atsugi (JP); Haruyuki Ishihara, Hino (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 428 days.

(21) Appl. No.: 12/635,549

(22) Filed: Dec. 10, 2009

(65) Prior Publication Data
US 2010/0149377 A1    Jun. 17, 2010

(30) Foreign Application Priority Data

| Dec. 12, 2008 | (JP) | 2008-317608 |
| Dec. 12, 2008 | (JP) | 2008-317609 |
| Dec. 12, 2008 | (JP) | 2008-317610 |
| Jan. 19, 2009 | (JP) | 2009-009222 |

(51) Int. Cl.
*H04N 5/228* (2006.01)

(52) U.S. Cl.
USPC ............ 348/222.1; 348/208.2; 348/231.5; 348/333.01; 348/333.02; 348/333.06; 348/333.12; 345/158

(58) Field of Classification Search
USPC ............ 348/231.5, 333.01, 333.02, 333.12, 348/333.06, 222.1, 208.2; 345/158
See application file for complete search history.

(56) References Cited

U.S. PATENT DOCUMENTS

| 6,137,468 | A  | * | 10/2000 | Martinez et al. ............. 345/649 |
| 6,819,362 | B2 | * | 11/2004 | Hsu ............................... 348/374 |
| 2001/0007469 | A1 | * | 7/2001 | Fuchimukai et al. ........ 348/208 |
| 2003/0063200 | A1 | * | 4/2003 | Isoyama ....................... 348/239 |
| 2003/0098847 | A1 | * | 5/2003 | Yamamoto .................... 345/158 |
| 2004/0004667 | A1 | * | 1/2004 | Morikawa et al. ........ 348/333.06 |
| 2004/0051793 | A1 | * | 3/2004 | Tecu et al. ................ 348/231.99 |
| 2004/0100487 | A1 | * | 5/2004 | Mori et al. .................... 345/724 |
| 2004/0239792 | A1 | * | 12/2004 | Shibutani et al. ......... 348/333.12 |
| 2005/0206736 | A1 | * | 9/2005 | Ng et al. .................... 348/208.7 |

FOREIGN PATENT DOCUMENTS

| JP | 2005-057378 | 3/2005 |
| JP | 2005-236883 | 9/2005 |
| JP | 2007-102290 | 4/2007 |

* cited by examiner

*Primary Examiner* — Usman Khan
(74) *Attorney, Agent, or Firm* — John C. Pokotylo; Straub & Pokotylo

(57) ABSTRACT

An imaging apparatus includes an imaging unit that includes a shooting lens for collecting an image of a subject to be shot; and an imaging element that forms the image collected by the shooting lens and generates image data through photoelectric conversion of formed image. The imaging apparatus also includes an inclination detector that detects an inclination of the imaging apparatus from a predetermined position, through a rotation around a shooting optical axis of the shooting lens. The apparatus also includes a control unit that changes an operating mode to a switchable state capable of switching between operating modes when a predetermined time has elapsed in a state in which the inclination detected by the inclination detector falls within a predetermined range in which the operating modes of the imaging apparatus are switched to each other.

21 Claims, 27 Drawing Sheets

12a   10

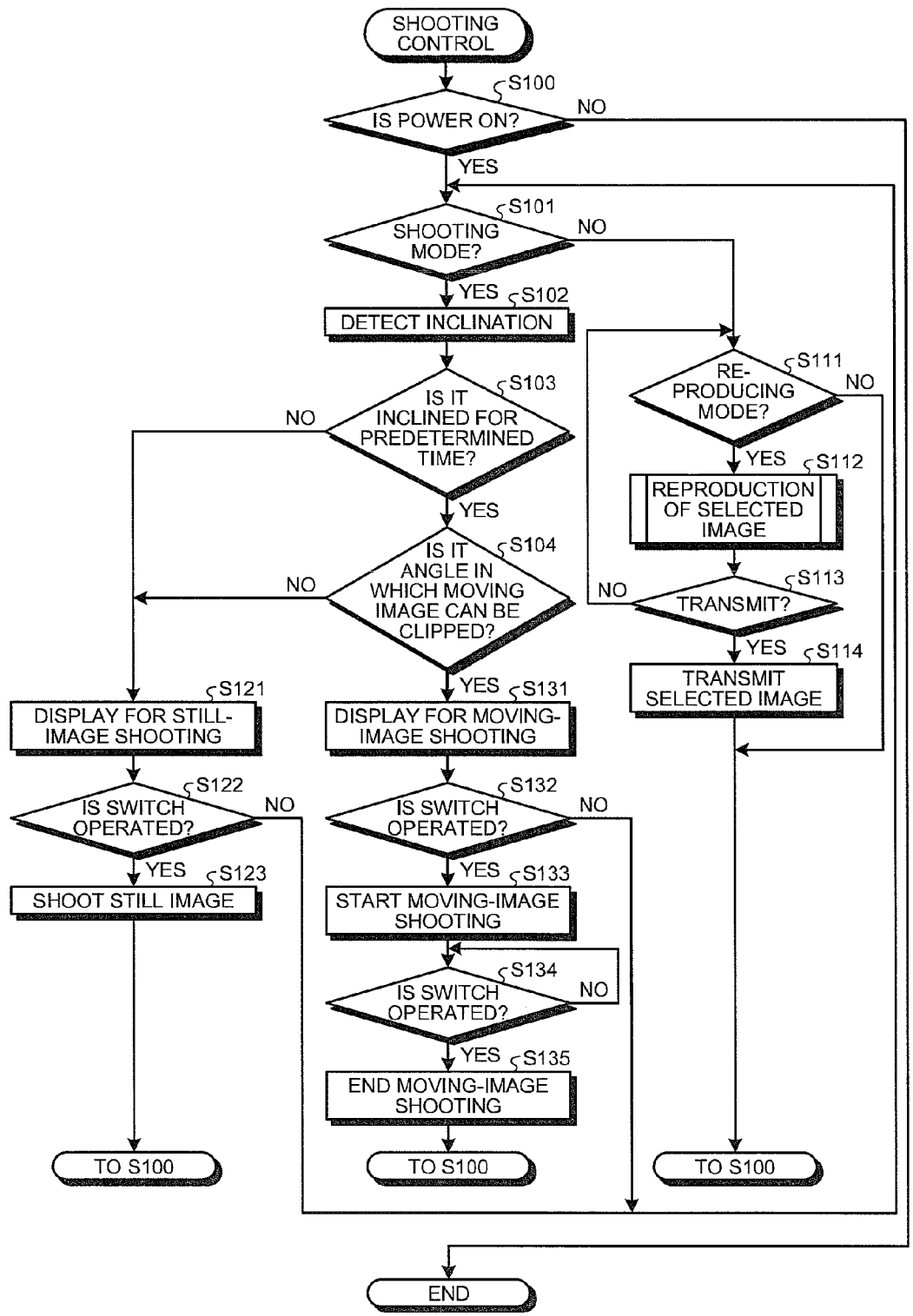

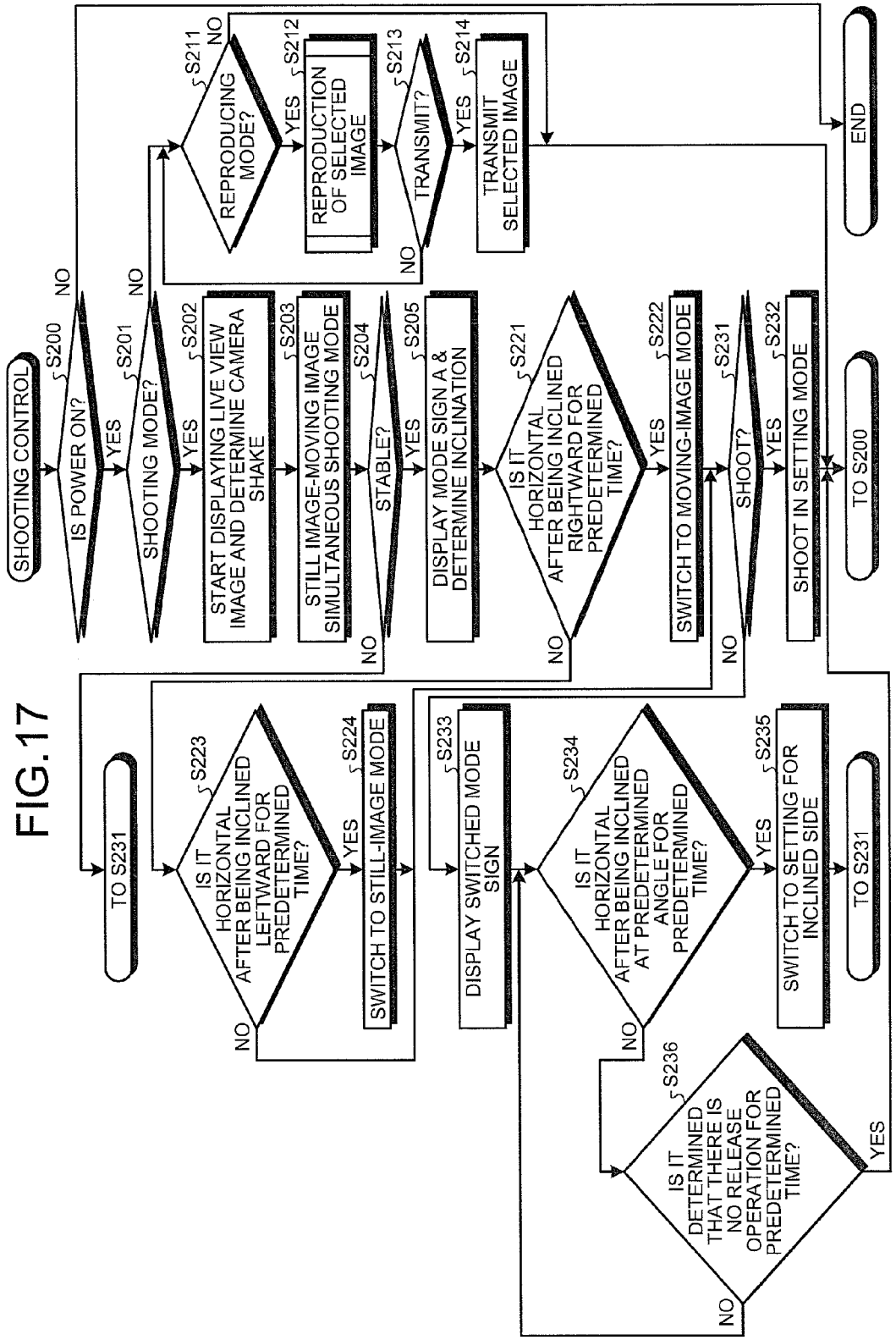

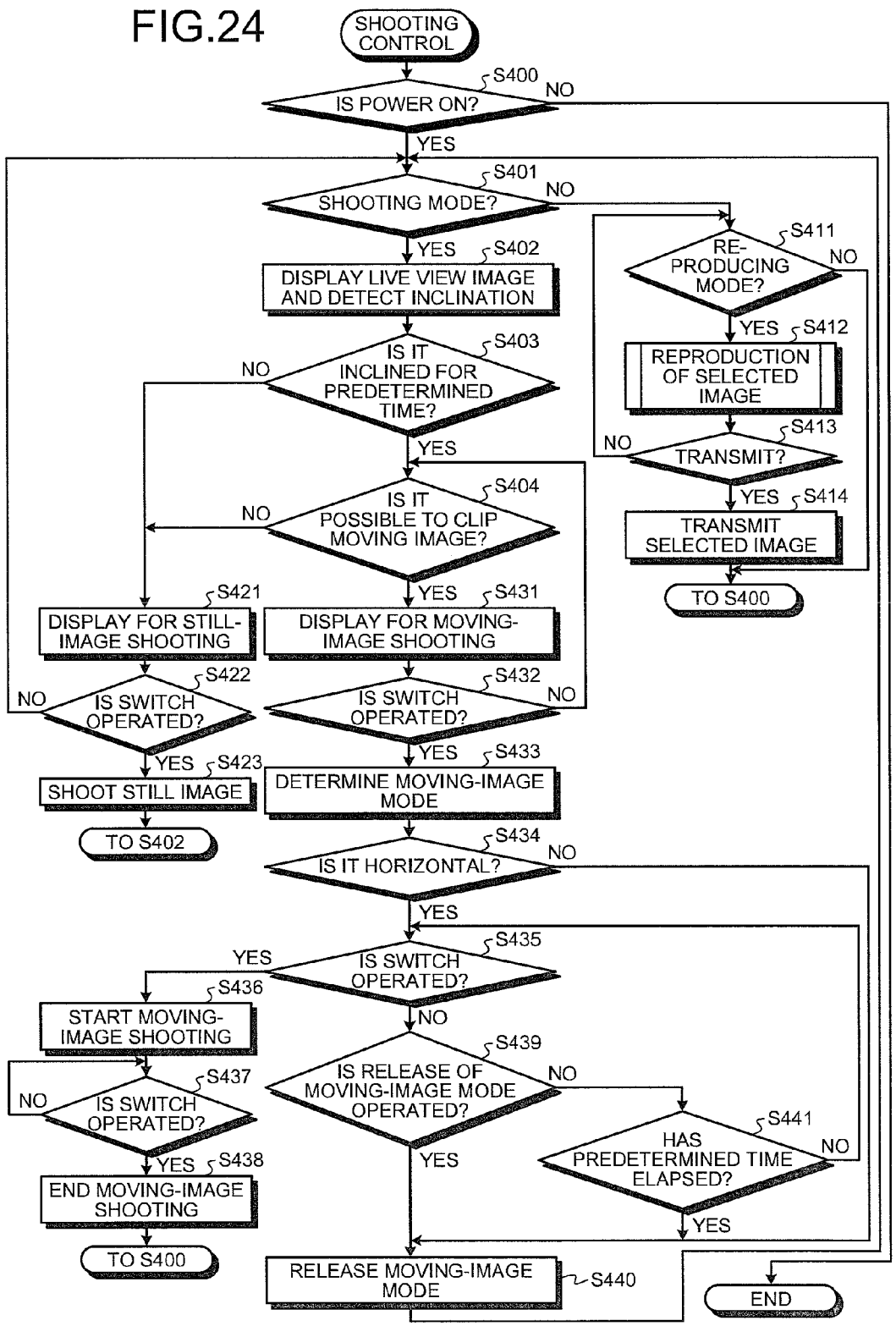

IMAGING APPARATUS HAVING A CHANGEABLE OPERATING MODE RESPONSIVE TO AN INCLINED ORIENTATION

CROSS-REFERENCE TO RELATED APPLICATIONS

This application is based upon and claims the benefit of priority from Japanese Patent Application No. 2008-317608, filed on Dec. 12, 2008, Japanese Patent Application No. 2008-317609, filed on Dec. 12, 2008, Japanese Patent Application No. 2008-317610, filed on Dec. 12, 2008 and Japanese Patent Application No. 2009-009222, filed on Jan. 19, 2009, the entire contents of which are incorporated herein by reference.

BACKGROUND OF THE INVENTION

1. Field of the Invention

The present invention relates to an imaging apparatus such as a digital camera, a digital video camera, and a mobile phone with a digital camera, which include a function of shooting a still image and a moving image.

2. Description of the Related Art

Imaging apparatuses such as a digital camera, a digital video camera, and a mobile phone with a digital camera, which include a function of shooting a still image and a moving image are configured so that, because of digitization of image signals, a still image and a moving image can be easily shot by mode switching. More specifically, if a digital image is continuously shot and the shot images are subjected to inter-frame compression, then a moving image is obtained, while if a digital image is not continuously shot, then a still image is obtained.

If either one of still-image shooting and moving-image shooting is determined by mode setting through switching of a switch, a photo opportunity is inevitably missed. Therefore, there is known an imaging apparatus that simultaneously performs the still-image shooting and the moving-image shooting (for example, Japanese Laid-open Patent Publication No. 2005-057378). However, simultaneous shooting of the still image and the moving image causes a data amount of images to become enormous, and thus arrangement of the images becomes complicated. Generally, by mode switching using the switch, a mode for the still image or for the moving image is set and then the still image or the moving image is shot.

Japanese Laid-open Patent Publication No. 2005-236883 describes an imaging apparatus capable of switching between a shooting mode and a reproducing mode depending on a shooting attitude. More specifically, the imaging apparatus has a built-in shooting-attitude detection sensor, and is configured to set the shooting mode if the shooting attitude is horizontal (if the imaging apparatus is held in a horizontal attitude) and to set the reproducing mode if the shooting attitude is vertical (if the imaging apparatus is held in a vertical attitude).

The publication of the patent application also describes a configuration in which if the shooting attitude is horizontal, then the mode is changed to the shooting mode, and if the shooting attitude is vertical and is returned to the horizontal shooting attitude within a predetermined time, then it is changed to the reproducing mode.

In the configuration described in Japanese Laid-open Patent Publication No. 2005-236883, it is possible to switch between the shooting mode and the reproducing mode while the imaging apparatus is held by one hand. However, a display unit such as a liquid crystal display (LCD) provided in the backside of the imaging apparatus is generally a landscape-oriented screen, and is changed to a portrait-oriented display screen if the imaging apparatus is held vertically. Therefore, in the configuration in which the reproducing mode is set when the imaging apparatus is held vertically, a landscape-oriented shot image shot when the imaging apparatus is held horizontally is reproduced on a portrait-oriented liquid crystal display, resulting in a hard-to-view display with unnatural feeling.

Moreover, in the configuration in which the shooting attitude is changed to vertical and is returned to the horizontal shooting attitude within the predetermined time and then the reproducing mode is set, the predetermined time has to be waited after the shooting attitude is changed to vertical, which requires a time for mode switching. Besides, there may easily occur an erroneous operation in which returning to the horizontal shooting attitude happens before the predetermined time passes.

Urgency in the mode switching between the shooting mode and the reproducing mode is not particularly need. On the contrary, if the mode switching between a still-image shooting mode and a moving-image shooting mode requires time, then a photo opportunity may be missed. Therefore, for the mode switching between the still-image shooting mode and the moving-image shooting mode, it is not possible to use the configuration of switching between the modes by changing the attitude to the vertical shooting attitude and then returning the attitude to the horizontal shooting attitude within the predetermined time.

SUMMARY OF THE INVENTION

An imaging apparatus according to an aspect of the present invention includes an imaging unit that includes a shooting lens for collecting an image of a subject to be shot; and an imaging element that forms the image collected by the shooting lens and generates image data through photoelectric conversion of formed image. The imaging apparatus also includes an inclination detector that detects an inclination of the imaging apparatus from a predetermined position, through a rotation around a shooting optical axis of the shooting lens; and a control unit that changes an operating mode to a switchable state capable of switching between operating modes when a predetermined time has elapsed in a state in which the inclination detected by the inclination detector falls within a predetermined range in which the operating modes of the imaging apparatus are switched to each other.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a flowchart of shooting control by the imaging apparatus according to the first embodiment of the present invention;

FIG. 17 is a flowchart of shooting control by the imaging apparatus according to the second embodiment of the present invention;

FIG. 24 is a flowchart of shooting control by the imaging apparatus according to the fourth embodiment of the present invention.

DETAILED DESCRIPTION OF THE PREFERRED EMBODIMENTS

Exemplary embodiments of the present invention are explained below with reference to the accompanying drawings.

In an imaging apparatus according to a first embodiment of the present invention, when a power switch is ON and a shooting mode is set, an inclination of the imaging apparatus is detected by an inclination detector, and if the inclination falls within an angle range in which an aspect of a moving image can be clipped, a central control circuit controls a display unit to perform a display for moving-image shooting. Meanwhile, if an inclination angle detected by the inclination detector does not fall within the angle range in which the aspect of the moving image can be clipped, then the display unit performs a display for still-image shooting. In this manner, in the first embodiment, a moving-image shooting mode and a still-image shooting mode are switched to each other corresponding to an attitude of the imaging apparatus. Moreover, if the release switch is not operated in the display for the moving-image shooting or the still-image shooting, the inclination is detected and the mode is switched to a corresponding mode.

On the other hand, when the imaging apparatus is set to the reproducing mode, switching from a still-image display mode being initial setting to a moving-image display mode is controlled according to the inclination detected by the inclination detector. In the moving-image display mode of the modes, a screen area corresponding to an aspect ratio for a moving image is displayed.

Figure 1:
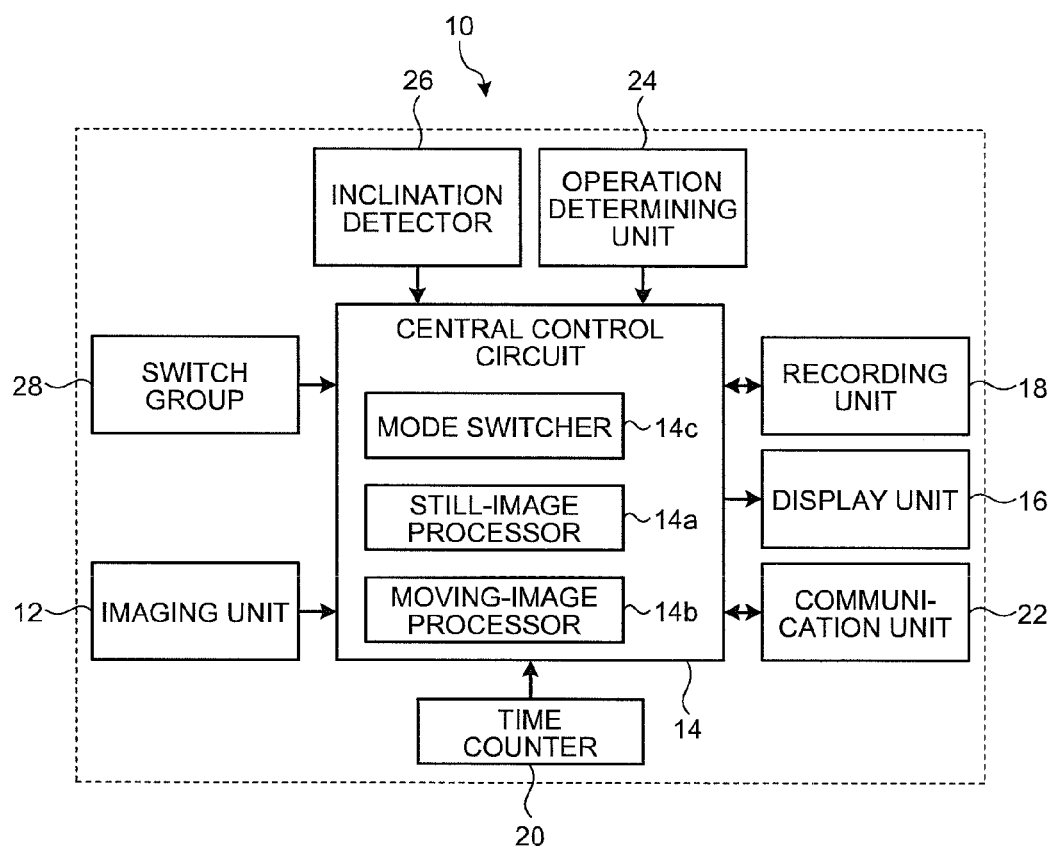
FIG. 1 is a schematic block diagram of a main portion of an imaging apparatus according to a first embodiment of the present invention.

FIG. 1 is a schematic block diagram of a main portion of the imaging apparatus according to the first embodiment of the present invention which is embodied as a digital camera. As shown in FIG. 1, a digital camera (imaging apparatus) 10 is configured to include an imaging unit 12, a central control circuit (control unit) 14, a display unit (display) 16, a recording unit (memory) 18, a time counter (clock) 20, a communication unit 22, an operation determining unit 24, an inclination detector 26, and a switch group 28.

The imaging unit 12 is formed with a shooting lens 12a (see FIG. 2A) and an imaging element 12b (see FIG. 7A) such as a charge-coupled device (CCD) and a complementary metal oxide semiconductor (CMOS) sensor. An image obtained from a subject to be shot is collected by the shooting lens 12a. The image collected by the shooting lens 12a is formed on the imaging element 12b, the formed image is photoelectrically converted by the imaging element 12b, and is then output as digitized image data to the central control circuit 14. In the central control circuit 14, the image data is subjected to required image processes such as correction of color and gradation or a compression process, and, for example, the still image is converted to an image file in a Joint Photographic Experts Group (JPEG) format, and the moving image is converted to an image file in H.264 format. The converted image files are recorded on the recording unit (memory) 18 such as a flash memory.

The time counter (clock) 20 counts shooting date and time, and information for the counted date and time is recorded on the recording unit 18 together with a shot image. Thus, shot images are recorded in good order, so that it is easy to search for them. Moreover, because shooting date and time information is recorded together with a shot image, thumbnails in the reproducing mode can be displayed in order from an image near to the shooting date and time. The time counter 20 includes a stopwatch function, and counts a time for which the digital camera 10 is kept inclined.

In order to check a composition and a timing for shooting before the shooting, an image signal sent from the imaging unit 12 is displayed as a live view image (through moving image) on the display unit 16. Moreover, not only a through moving image before shooting but also an image signal in the recording unit 18 is expanded for reproduction in the central control circuit 14 and displayed on the display unit 16.

The display unit 16 is formed with a liquid crystal display (LCD) or an organic electroluminescence (EL) display, or the like, and is generally provided on the backside of the digital camera 10 to display an image contained in image data.

The central control circuit (control unit) 14 that performs an image process on a shot image sent from the imaging unit 12 is composed of, for example, a central processing unit (CPU) and a micro processing unit (MPU), and includes a still-image processor 14a that processes a still image, a moving-image processor 14b that processes a moving image, and a mode switcher 14c that determines which of a still-image process or a moving-image process is used to process an image and switches between modes. A shot image shot by the imaging unit 12 is selectively processed by the still-image processor 14a or the moving-image processor 14b, and is recorded on the recording unit 18.

The communication unit 22 is composed of a universal serial bus (USB) terminal and a wireless transmitter/receiver and so forth. The communication unit 22 transmits data for the shot image recorded on the recording unit 18 to an external display unit such as a television (TV) (including a display unit for reproduction only such as a photo storage viewer and a digital photo frame) or to another imaging apparatus, and also receives data for shot image recorded in another imaging apparatus.

The operation determining unit 24 detects an operation of a power switch (power-supply switch) for setting a shooting ready state, an operation of the release switch, and an operation by a photographer such as selection of a shooting mode or a reproducing mode, and outputs the result of detection to the central control circuit (control unit) 14. The central control circuit 14 controls the setting of the shooting mode of the digital camera 10 based on the result of detection input from the operation determining unit 24.

The inclination detector 26 detects an inclination (inclination angle) of the digital camera 10 around an optical axis (shooting optical axis) of the shooting lens 12a. The first embodiment is significantly characterized in that switching between the shooting modes such as the still-image mode and the moving-image mode is performed according to the result of output of the inclination detector 26. The mode switcher 14c of the central control circuit 14 determines which of processes: a still-image shooting process and a moving-image shooting process is performed based on the inclination of the digital camera 10 detected by the inclination detector 26. If the mode switcher 14c determines that the still-image shooting process is to be performed, then the still-image processor 14a performs the still-image shooting process, while if the mode switcher 14c determines that the moving-image shooting process is to be performed, then the moving-image processor 14b performs the moving-image shooting process.

The switch group 28 is formed with a release switch 28a (see FIGS. 3A, 3B), a power switch (power-supply switch), a menu key, a decision key (OK key), a zoom switch (zoom SW), and a mode key, and when any one of the switches is operated, the switch operation is detected by the operation determining unit 24, and a process corresponding to the switch operation is performed under the control of the central control circuit 14.

The shot image obtained through still-image shooting or through moving-image shooting and recorded on the recording unit 18 is subjected to a reproduction process by the central control circuit 14 and displayed on the display unit 16. This allows the photographer to immediately check whether there is camera shake or how the digital camera 10 is inclined. Moreover, the shot image is reproduced or displayed by connecting the digital camera 10 to an external display unit such as TV through the communication unit 22.

Figure 2A:
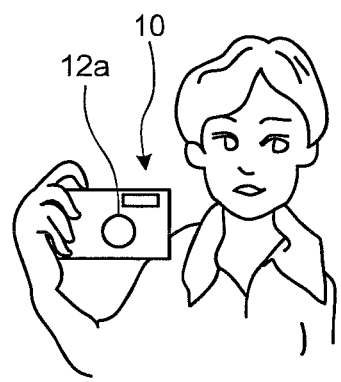
FIGS. 2A and 2B are schematics illustrating ways to shoot when the imaging apparatus according to the first embodiment of the present invention is held in a horizontal or inclined attitude.
Figure 2B:
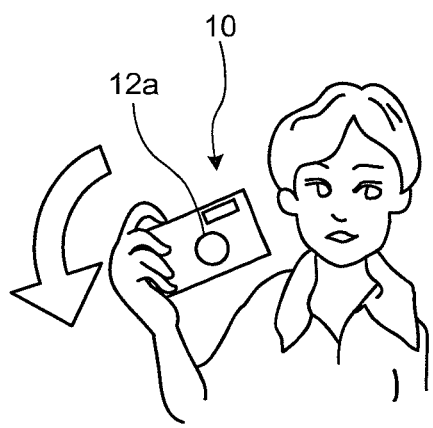
Figure 3A:
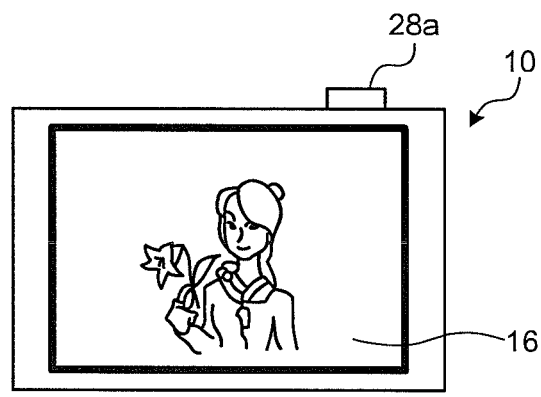
FIGS. 3A and 3B are schematics illustrating live view images on a liquid crystal display when the imaging apparatus according to the first embodiment of the present invention is held in the horizontal or inclined attitude.
Figure 3B:
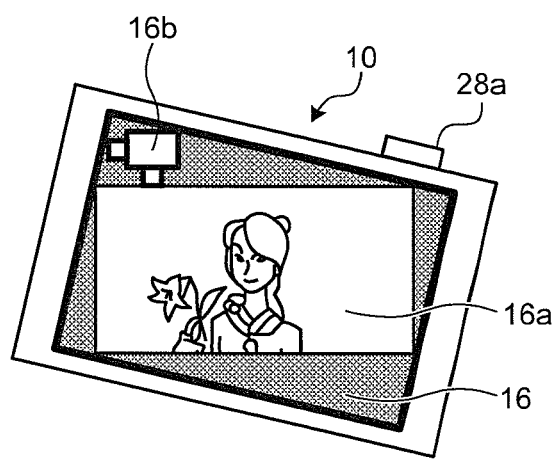

FIGS. 2A and 2B are schematics illustrating ways to shoot when the digital camera 10 is held in a horizontal or inclined attitude. FIGS. 3A and 3B are schematics illustrating live view images on a liquid crystal display when the digital camera 10 is held in the horizontal or inclined attitude. In the following, "the digital camera 10 is held in the horizontal attitude" means that the digital camera 10 is assumed so that the release switch is positioned on the top side thereof (see FIG. 3A). Further, the inclination angle is obtained by setting a state in which the digital camera 10 is held in the horizontal attitude, as a reference (0 degree).

When the digital camera 10 is set to the shooting mode, the inclination detector 26 constantly detects an inclination of the digital camera 10. Therefore, if the digital camera 10 is held in the horizontal attitude, then it is set to the still-image mode, while if an inclination of the digital camera 10 exceeds a predetermined angle, then it is immediately switched from the still-image mode to the moving-image mode.

As shown in FIG. 2A, if the digital camera 10 is held in the horizontal attitude without being rotated around the optical axis (shooting optical axis) of the shooting lens 12a, then, as shown in FIG. 3A, the entire surface of a landscape-oriented liquid crystal display forming the display unit 16 is used to display a live view image thereon.

On the other hand, as shown in FIG. 2B, if the digital camera 10 is rotated around the shooting optical axis and is held in an inclined attitude from the horizontal position, the inclination angle is detected by the inclination detector 26. The central control circuit 14 determines whether the inclination angle detected by the inclination detector 26 exceeds a predetermined angle. As a result of detection, when the inclination angle exceeds the predetermined angle, then the mode switcher 14c performs switching from the still-image mode to the moving-image mode. "Rotation" mentioned here represents that the digital camera 10 is rotated, as shown in FIG. 2B, around the optical axis of the shooting lens 12a to be inclined from its horizontal state as shown in FIG. 2A. In FIG. 2B, the digital camera 10 is rotated to be inclined clockwise (counterclockwise when viewed from the subject side) around the optical axis of the shooting lens, being a rotation axis, when viewed from the photographer.

When the shooting mode of the digital camera 10 is set to the moving-image mode, the display unit 16 is also inclined as shown in FIG. 3B. In this case, a frame 16a with an aspect ratio (e.g., 16:9 as TV standard) for the moving image appears on the display unit 16, a sign 16b indicating the moving-image mode is displayed outside the frame 16a. The sign 16b is, for example, a mark representing a video camera. The mark representing the video camera may be blinked to emphasize the moving-image mode.

Next, a case in which the digital camera 10 is set to the reproducing mode is explained below. The power switch (power-supply switch) for the digital camera 10 is turned ON. Then, as shown in FIG. 2A, by setting the reproducing mode in a state in which the digital camera 10 is not inclined but is held in the horizontal attitude, a still-image display mode (still-image reproducing mode) is set as an initial mode, and a still image is displayed on the display unit 16.

On the other hand, in the reproducing mode, as shown in FIG. 2B, by rotating the digital camera 10 around the shooting optical axis and holding it in an attitude inclined from the horizontal position, the inclination angle is detected by the inclination detector 26. The central control circuit 14 determines whether the inclination angle detected by the inclination detector 26 exceeds the predetermined angle. As a result of detection, when the inclination angle exceeds the predetermined angle, then the mode switcher 14c performs switching from the still-image display mode to the moving-image display mode (moving-image reproducing mode).

Figure 4A:
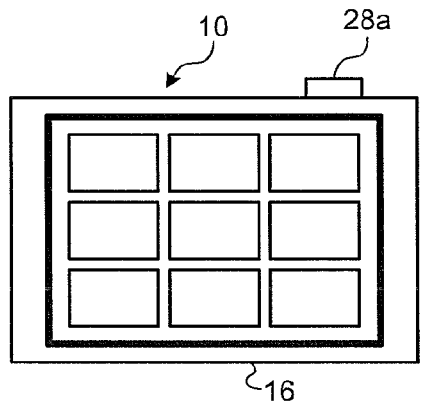
FIGS. 4A to 4C are schematics illustrating displays of the liquid crystal display when the imaging apparatus according to the first embodiment of the present invention is held in the horizontal or inclined attitude.
Figure 4B:
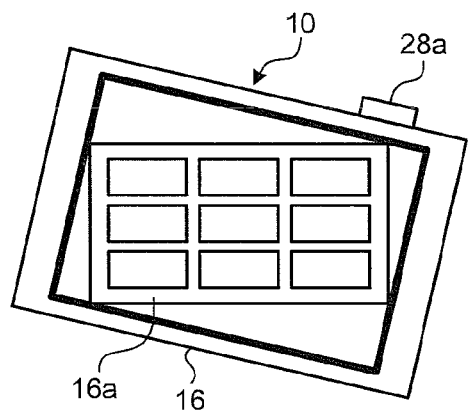
Figure 4C:
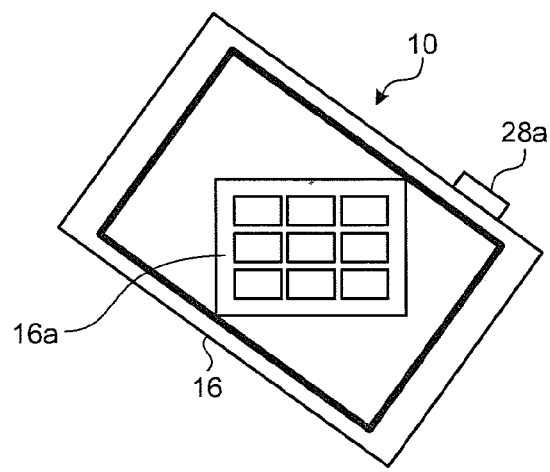

FIGS. 4A to 4C are schematics illustrating displays on the liquid crystal display when the digital camera is held in the horizontal or inclined attitude.

The digital camera 10 is set to the reproducing mode and is held in the horizontal attitude without being inclined, then, as shown in FIG. 4A, in the still-image display mode being the initial setting, thumbnails of still images in the form of a list of the still images obtained from a mixture of still images and moving images are displayed on the display unit 16.

By rotating the digital camera 10 and holding it in an attitude inclined from the horizontal position, the mode is switched from the still-image display mode to a moving-image display mode, and, as shown in FIG. 4B, thumbnails of moving images in the form of a list of the moving images obtained from a mixture of still images and moving images are displayed on the display unit 16. When the moving-image display mode is to be set, the frame 16a with the aspect ratio of 16:9 for the moving image is displayed on the display unit 16. This allows the photographer to easily recognize the mode as the moving-image display mode.

It should be noted that a reduced image of the still image is displayed in the thumbnail, and a typical image (frame) of the moving image is displayed therein.

In this manner, by inclining the digital camera 10 from the position in which it is held in the horizontal attitude, the mode is switched from the still-image display mode to the moving-image display mode, and the moving image is reproduced and displayed in its inclined state.

An aspect ratio (horizontal to vertical ratio) of 4:3 for a display screen of the still image is standardized based on standard of paper to be printed or of photographic paper, while an aspect ratio for reproducing the moving image is set to 16:9 being TV standard, which is set to be horizontally longer than the display screen for the still image. As for the display for reproducing the moving image, if its display area is ensured at the same aspect ratio as that of the still image without being landscape-oriented, this causes an uncomfortable display, as shown in FIG. 4C, and the photographer to feel unnatural, and thus this display is not preferable in terms of a design and an intuitive feel.

More specifically, in the reproduction of the moving image, because the shooting screen is set to the aspect ratio of 16:9 based on assumption of the reproduction on TV, the image to be reproduced can be fitted in the frame 16a in the moving-image display mode even if the display unit 16 is kept arranged diagonally. In other words, because an appropriate display area is ensured, no trouble may occur even in the reproduction in the inclined state, but rather it could be said that it is more natural.

Figure 5A:
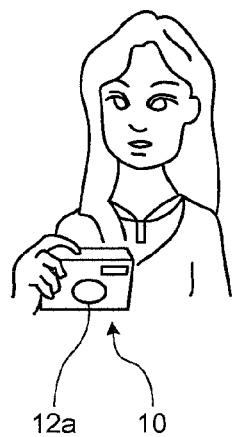
FIGS. 5A to 5C are schematics illustrating ways to enjoy images shot by the imaging apparatus according to the first embodiment of the present invention.
Figure 5B:
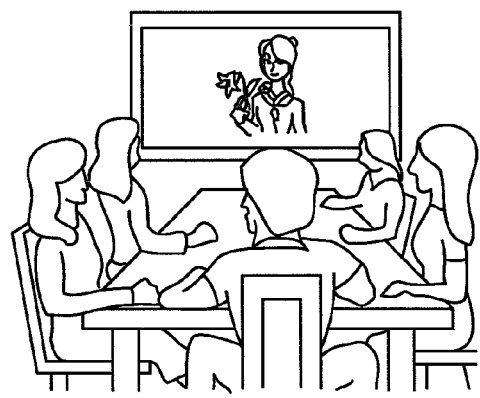
Figure 5C:
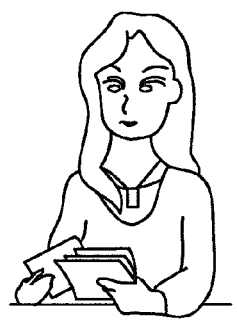

FIGS. 5A to 5C are schematics illustrating ways to enjoy images shot by the digital camera 10. Situations of viewing the shot image are assumed as follows: as shown in FIG. 5A, the shot image is displayed on the display unit 16 and is enjoyed right after the shooting, as shown in FIG. 5B, it is displayed on an external TV screen and is enjoyed simultaneously by everyone, and as shown in FIG. 5C, it is printed out and is enjoyed afterward in an easy manner. As explained above, various methods for reproducing images shot by the digital camera 10 are considered, and thus, the moving image is preferable when it is viewed on TV while the still image is preferable when it is printed. Namely, easy shooting in various modes corresponding to various reproduction methods becomes an essential condition of future digital cameras.

As for the display on TV as shown in FIG. 5B, because TV is getting converted into a high-definition TV in recent years, it is preferable to display images with image quality suitable for this. Namely, image quality with 1920×1080 pixels or with about 2 mega (M) has only to be required even if it is a full high-definition TV (full HD). This indicates that the image quality requires a smaller value than ten million pixels (10 M) being the number of pixels required when an ordinary still image is to be shot.

On the other hand, there is no such restriction upon output of the still image, however, it is necessary to assume various use applications from a small size (e.g., a quarter-plate size and a postcard size) used to put it to a photo album, as shown in FIG. 5C, to a large size (e.g., a half-plate size) used to make the still image to a poster and stick it on somewhere. Thus, higher image quality of still images is usually preferable.

In the first embodiment, because it is assumed that the moving image is reproduced on TV, the screen aspect ratio is specified as 16:9. Even if these restrictions are considered, shooting becomes possible with sufficient image quality and an appropriate aspect ratio without restriction to an angle of view based on the frame 16a as shown in FIG. 3B. Moreover, assuming that it is reproduced on TV, it is thought that the construction upon moving-image shooting may be limited to a landscape-oriented one. Therefore, in the first embodiment, an optimally limited area is used for shooting when the moving image is shot.

Figure 6A:
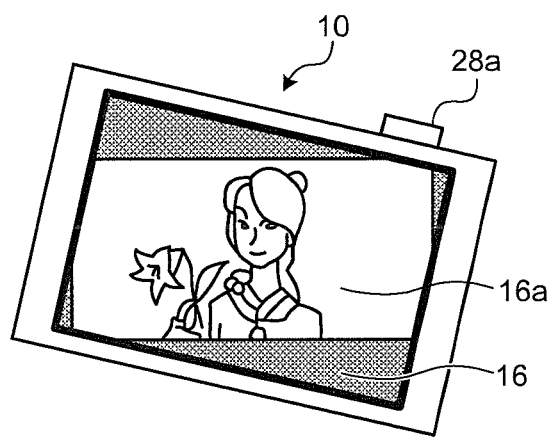
FIGS. 6A and 6B are schematics illustrating live view images on the liquid crystal display when a moving image is shot.
Figure 6B:
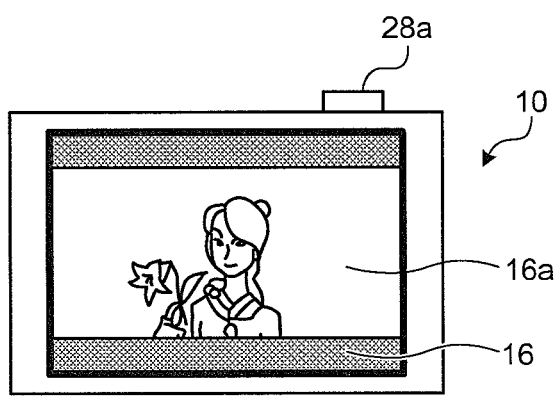

FIGS. 6A and 6B are schematics illustrating live view images on the display unit 16 when a moving image is shot by the digital camera 10. When a moving image is to be shot, because a subject to be shot moves, there are many cases that photographers have no time to check and think of its surroundings that will appear in the image. Therefore, as shown in FIG. 6A, the surroundings are sacrificed and the central portion of the image in which the subject as a target appears may be enlarged to be displayed.

At the time of reproduction, as shown in FIG. 6B, the moving image with a predetermined aspect ratio may be reproduced without inclination of the digital camera.

Figure 7A:
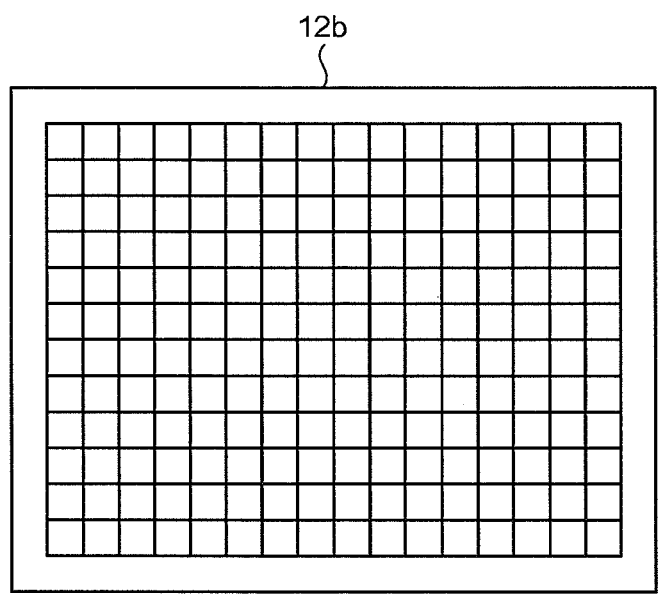
FIGS. 7A and 7B are schematics illustrating postures of an imaging element and the imaging apparatus when a still image is shot.
Figure 7B:
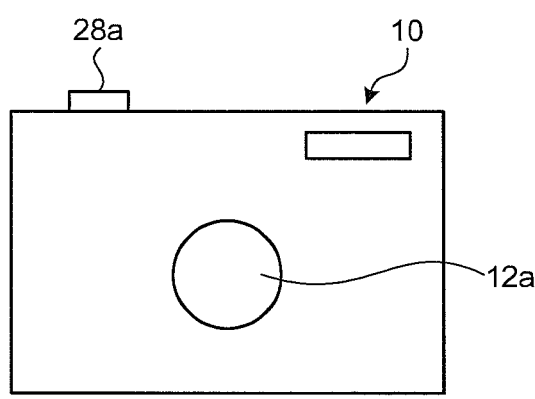

FIGS. 7A and 7B are schematics illustrating postures of an imaging element and the digital camera when a still image is shot. In FIG. 7A, the imaging element 12b of the imaging unit 12 has an aspect ratio of 4:3 for the still image, and has 10 M pixels. Blank portions on the top, bottom, left, and right of FIG. 7A represent margins of the imaging element, in which there are pixels but the pixels are not used. As shown in FIG. 7B, if the digital camera 10 is not rotated around the optical axis (shooting optical axis) of the shooting lens 12a but is held horizontally, then the imaging element 12b is determined as Landscape, and the still image is shot by using the entire area of the imaging element 12b. If the digital camera 10 is held vertically although it is not shown, the imaging element 12b is determined as Portrait, and in this case also, the still image is shot by using the entire area of the imaging element.

Figure 8A:
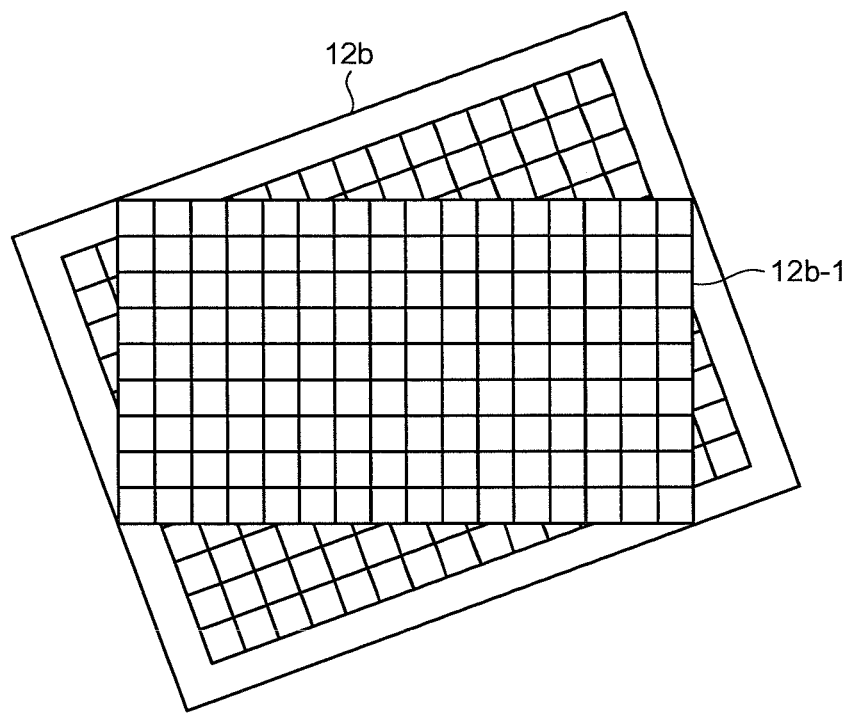
FIGS. 8A and 8B are schematics illustrating postures of the imaging element and the imaging apparatus when a moving image is shot.
Figure 8B:
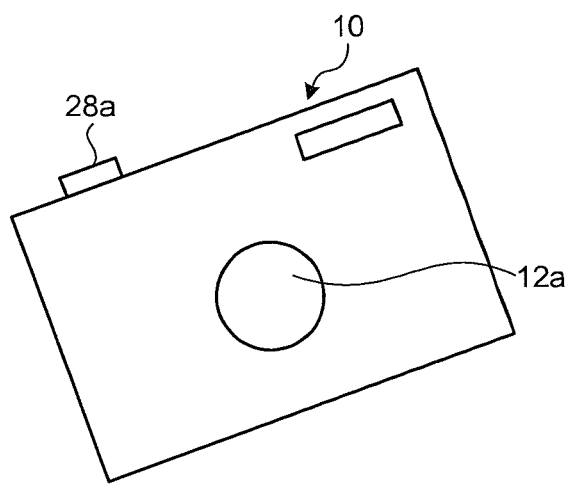

FIGS. 8A and 8B are schematics illustrating postures of the imaging element 12b and the digital camera 10 when a moving image is shot. As shown in FIG. 8B, by inclining the digital camera 10 to be switched to the moving-image mode, even if an imaging area 12b-1 with an aspect ratio of 16:9 is clipped, there is almost no need to change the angle of view in the horizontal direction. Moreover, because the imaging element 12b has 10 M pixels, 2 M or more pixels can be obtained unless the imaging area is reduced to one-fifth thereof, and the image quality for the full high-definition TV is thereby ensured. More specifically, by clipping the imaging area 12b-1 with a sacrifice of small portions at four corners thereof, it is possible to obtain the imaging area 12b-1 with the aspect ratio of 16:9 for the moving image corresponding to the image quality of the full high-definition TV.

Figure 9:
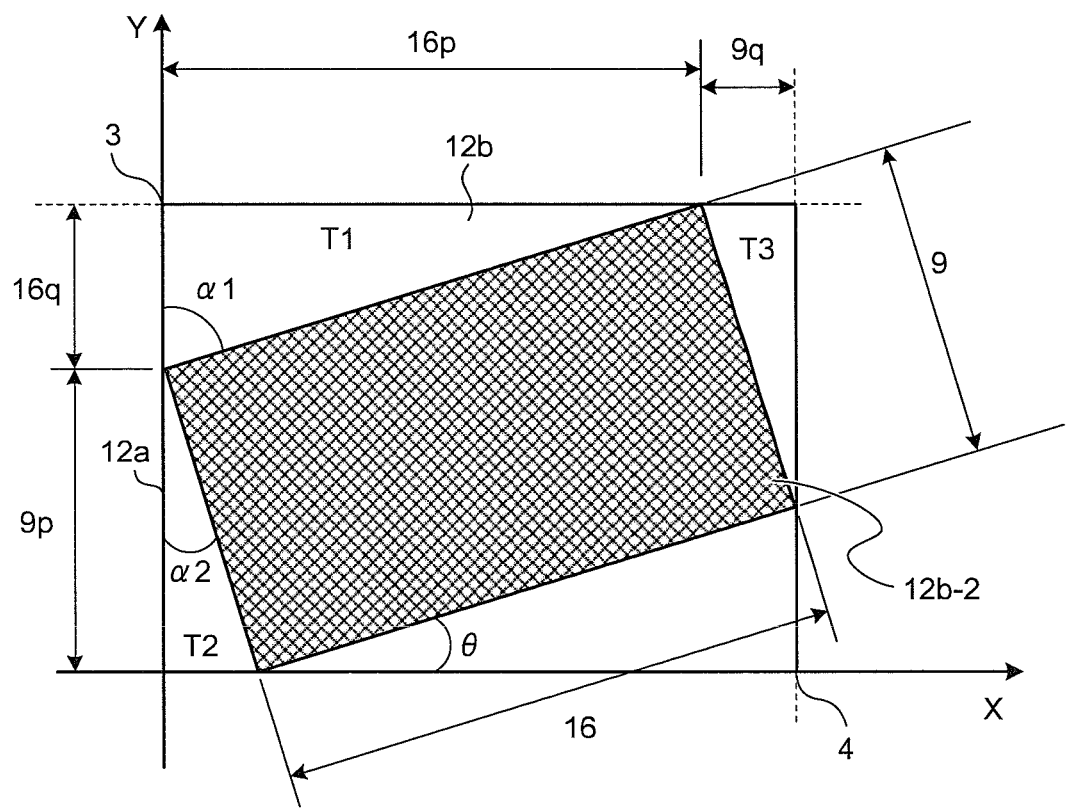
FIG. 9 is a schematic diagram for determining an inclination angle in which an imaging area with an aspect ratio of 16:9 is obtained in a state of inclining a screen with an aspect ratio of 4:3.

FIG. 9 is a schematic diagram representing conditions for determining an inclination angle in which an imaging area with the aspect ratio of 16:9 is obtained in a state of inclining a screen with the aspect ratio of 4:3.

Assuming that a length in an X direction of the imaging element 12b is 4, a length in a Y direction is 3, and an aspect ratio of the landscape-oriented imaging element 12b is 4:3, an inclination (inclination angle) θ required for clipping a diagonal imaging area (a shaded rectangular area) 12b-2 with the aspect ratio of 16:9 is determined.

By using the fact that a sum of angles α1 and α2 of triangles T1 and T2 respectively shown in FIG. 9 and an angle of the imaging area 12b-2 between the angles becomes 180 degrees, it is understood that the triangles T1 and T2 appearing at the corners of the imaging element 12b are similar, and that the triangle T2 and a triangle T3 are congruent.

The hypotenuse of the triangle T1 is a long side of the imaging area 12b-2, and the hypotenuses of the triangles T2 and T3 are short sides of the imaging area 12b-2. Therefore, if a longer one of the two sides of the triangle T1 that are orthogonal to each other is set to 16p and a shorter one thereof is set to 16q (p>q>0), then a longer one of the two sides of the triangle T2 that are orthogonal to each other is set to 9p and a shorter one thereof is set to 9q.

Because the aspect ratio of the imaging element 12b in the horizontal screen is 4:3, the following equations hold.

$$\text{Horizontal } 16p+9q=4 \quad (1)$$

$$\text{Vertical } 9p+16q=3 \quad (2)$$

By determining Equation (1)×9−Equation (2)×16, q is given by the following Equation (3).

$$q=12/175 \quad (3)$$

Likewise, by determining Equation (1)×16−Equation (2)×9, p is given by the following Equation (4).

$$p=37/175 \quad (4)$$

By determining a ratio q/p of q and p from Equations (3) and (4), the following Equation (5) is obtained.

$$q/p=12/37 \quad (5)$$

The ratio q/p corresponds to a ratio of the lengths of the sides in the triangle T1 that are orthogonal to each other. An inclination angle θ for shooting the moving image is determined from the ratio q/p. More specifically, in FIG. 9, because tan θ=q/p, $$\theta=\arctan(q/p) \quad (6)$$

From Equation (5) and θ=arctan(12/37), θ≅17.97°≅18° is obtained. More specifically, if the digital camera 10 is inclined by 17.97°≅18° from the state in which the digital camera 10 is held in the horizontal attitude, then the mode is switched to the moving-image mode, and the sign 16b as shown in FIG. 3B is displayed on the display unit 16. It may be configured so that if an inclination within a predetermined angle range is detected from the value of θ, then the mode is switched to the moving-image mode.

As explained above, the first embodiment is configured so that when the inclination detector 26 detects an inclination at an angle θ of the digital camera 10 around the shooting optical axis, the mode switcher 14c of the central control circuit 14 switches the mode from the still-image mode to the moving-image mode based on the result of detection.

The first embodiment assumes a case in which the digital camera 10 is rotated clockwise around the shooting optical axis when viewed from the photographer to be inclined as shown in FIGS. 2A and 2B. However, contrary to this, it may be configured so that the mode is switched from the still-image mode to the moving-image mode when the digital camera 10 is rotated counterclockwise around the shooting optical axis when viewed from the photographer to be inclined and an inclination of −θ is detected.

Figure 10A:
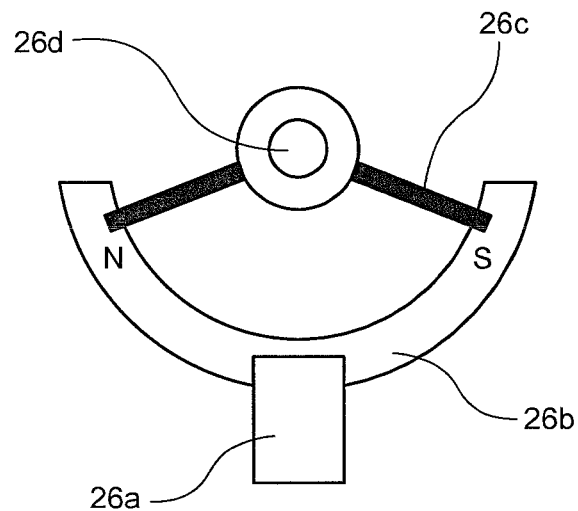
FIGS. 10A and 10B represent one example of a method of detecting an inclination by an inclination detector.
Figure 10B:
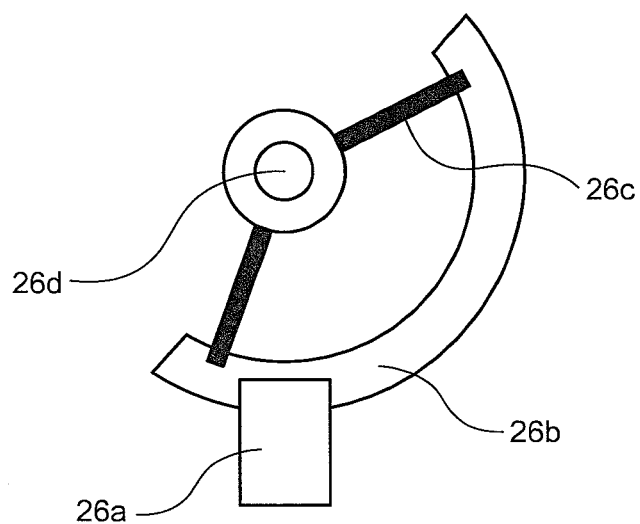

FIGS. 10A and 10B are schematics representing a schematic configuration of the inclination detector 26 and also one example of a method of detecting an inclination by the inclination detector 26.

The inclination detector 26 is formed with a combination of a hall element 26a and a magnet 26b which is made of a permanent magnet. The hall element 26a detects a change in a magnetic field due to the magnet 26b when the digital camera 10 is inclined, and an inclination is thereby detected.

In the inclination detector 26, an inverted V-shaped support arm portion 26c is pivotally supported by a horizontally arranged shaft 26d, the magnet 26b partially ringed is held by the ends of the support arm portion 26c, and the hall element 26a is provided near the magnet 26b. The magnet 26b and the support arm portion 26c are fixed to a body of the digital camera 10.

If the digital camera 10 is held horizontally, as shown in FIG. 10A, the magnet 26b is laterally balanced and the central portion thereof is closest to the hall element 26a.

On the other hand, when the digital camera 10 is rotated around the shooting optical axis to be inclined, as shown in FIG. 10B, the magnet 26b pivots. In this case, the hall element 26a detects a change in its magnetic field with the pivotal movement of the magnet 26b, and outputs a detection signal to the central control circuit 14. The central control circuit 14 determines an inclination angle of the digital camera 10 based on the received detection signal.

The inclination detector 26 composed of a combination of the hall element and the magnet is one example, and thus a gyro or a mercury switch for detecting camera shake may be used as the inclination detector.

Moreover, it may be determined, from a change of an image in the imaging element, whether the attitude of the digital camera 10 is changed. In this case, the imaging element 12b functions as the inclination detector.

FIG. 11 is a flowchart representing an overview of shooting control by the digital camera 10 according to the first embodiment. First, the digital camera 10 determines an operating state of the power switch (power-supply switch) at Step S100. If the power switch is not ON-operated (NO at Step S100), then the digital camera 10 ends the process, while if the power switch is ON-operated (YES at Step S100), then the digital camera 10 proceeds to Step S101, where it determines whether the operating mode is the shooting mode.

If the operating mode is not set to the shooting mode (NO at Step S101), then the digital camera 10 determines whether it is set to the reproducing mode (Step S111). As a result of detection, when the digital camera 10 is not set to the reproducing mode (NO at Step S111), the process returns to Step S100. Meanwhile, as a result of detection, when the digital camera 10 is set to the reproducing mode (YES at Step S111), a selected shot image is reproduced (Step S112). Details of a selected-image reproducing process at Step S112 will be explained later with reference to FIG. 12.

Subsequently, the digital camera 10 determines whether the image reproduced at Step S112 is transmitted externally (Step S113). As a result of detection, when the reproduced image is not transmitted (NO at Step S113), then the process returns to Step S111. Meanwhile, if it is determined that the reproduced image is transmitted (YES at Step S113), then the communication unit 22 transmits the image to an external TV or the like (Step S114), and the process returns to Step S100. The external TV reproduces the received image. In this case, many people can enjoy the image as shown in FIG. 5B.

On the other hand, at Step S101, if the digital camera 10 is set to the shooting mode (YES at Step S101), then the inclination detector 26 constantly detects an inclination of the digital camera 10 around the shooting optical axis (Step S102). As a result of detection, when the digital camera 10 is continuously inclined for a predetermined time (YES at Step S103) and if the central control circuit 14 determines that the inclination angle falls within a predetermined range from an angle θ (or −θ) in which the image with an aspect ratio for the moving image can be clipped (YES at Step S104), then the display unit 16 performs a display for moving-image shooting as shown in FIG. 3B (Step S131). In moving-image shooting, the inclination does not have to be detected by the inclination detector 26 because it may be troublesome if a moving image is suddenly changed to a still image due to vibrations or the like. In addition, during continuous shooting even in still-image shooting, the inclination does not have to be detected in order to achievement of power saving or prevention of malfunction.

After Step S131, the release switch 28a is operated (YES at Step S132), and the digital camera 10 starts moving-image shooting (Step S133). In the moving-image shooting, the moving-image processor 14b performs an image process with inter-frame compression. Because the image process is complicated, in the first embodiment, it is configured to input only an image signal (image signal of pixels corresponding to the image quality of high-definition TV) in which the number of pixels is reduced as small as possible by thinning them out of pixels in the imaging area 12b-2 of FIG. 9 or by summing pixels, to the moving-image processor 14b.

If the release switch 28a is not immediately operated at Step S132 (NO at Step S132), then the process returns to Step S101. Therefore, if the photographer returns the digital camera 10 to the horizontal state without pressing the release switch 28a even if the display for the moving-image shooting is on the display unit 16, the mode is switched to the still-image mode in response to detection of the inclination at Step S102, and thus the photographer can shoot a still image at once.

If the release switch 28a is not operated (NO at Step S134) after the digital camera 10 starts shooting a moving image at Step S133, the process returns to Step S134, and the moving-image shooting is then continued. At Step S134, if the operation of the release switch 28a is detected (YES at Step S134), then the digital camera 10 ends the moving-image shooting (Step S135) and returns to Step S100.

Next, a case in which the inclination detected by the inclination detector 26 is not continuously kept for a predetermined time (NO at Step S103) is explained below. In this case, the display unit 16 performs a display for the still-image shooting as shown in FIG. 3A (Step S121). If the inclination detected by the inclination detector 26 is continuously kept for the predetermined time (YES at Step S103), and if the inclination is not close to the angle in which an image with the aspect ratio for the moving image can be clipped (NO at Step S104), the digital camera 10 proceeds to Step S121.

If the release switch 28a is operated within the predetermined time after Step S121 (YES at Step S122), then the digital camera 10 shoots a still image (Step S123), compresses image data by using, for example, 10 M pixels as they are so that the image quality is satisfactory for a poster size, and records the compressed image data on the recording unit 18. When the shooting of the still image at Step S123 is ended, the digital camera 10 returns to Step S100. Meanwhile, if the release switch 28a is not operated at Step S122 (NO at Step S122), the digital camera 10 returns to Step S101.

It is assumed that standby time (predetermined time) at Steps S122 and S132 is about 10 minutes, and the time is counted by a timer of the time counter 20.

As explained above, if the release switch 28a is not operated within the predetermined time and left as it is at Step S122, the process returns to Step S101, and the inclination is detected at Step S102. Thus, even if the display for the still-image shooting is on the display unit 16, by inclining the digital camera 10 without pressing the release switch 28a, the inclination is detected at Step S102 and the mode is switched to the moving-image mode. Therefore, even when the photographer is about to shoot in the still-image mode, he or she can immediately perform moving-image shooting.

As explained above, according to the first embodiment, the switching between the moving-image mode and the still-image mode becomes possible corresponding to the attitude of the digital camera 10, and thus, only by controlling how to hold the digital camera 10, it is possible to perform still-image shooting or moving-image shooting also on an important subject to be shot without missing a photo opportunity.

Moreover, the switching between the moving-image mode and the still-image mode is possible while the digital camera 10 is held by one hand. Thus, even if a photographer is holding something (light, stock, or pickel) by the other hand or even if the photographer does not smoothly carried out a fine operation because of wearing gloves, like in cases of underwater photography and photography of mountains in the snow, the moving-image shooting and the still-image shooting can be carried out by one-handed operation without any trouble.

Furthermore, only by inclining the digital camera 10, it becomes ready to shoot the moving image, and in the moving-image mode, a screen area is displayed with the aspect ratio for the moving image. Thus, the moving image can be shot without unnatural feeling.

Figure 12:
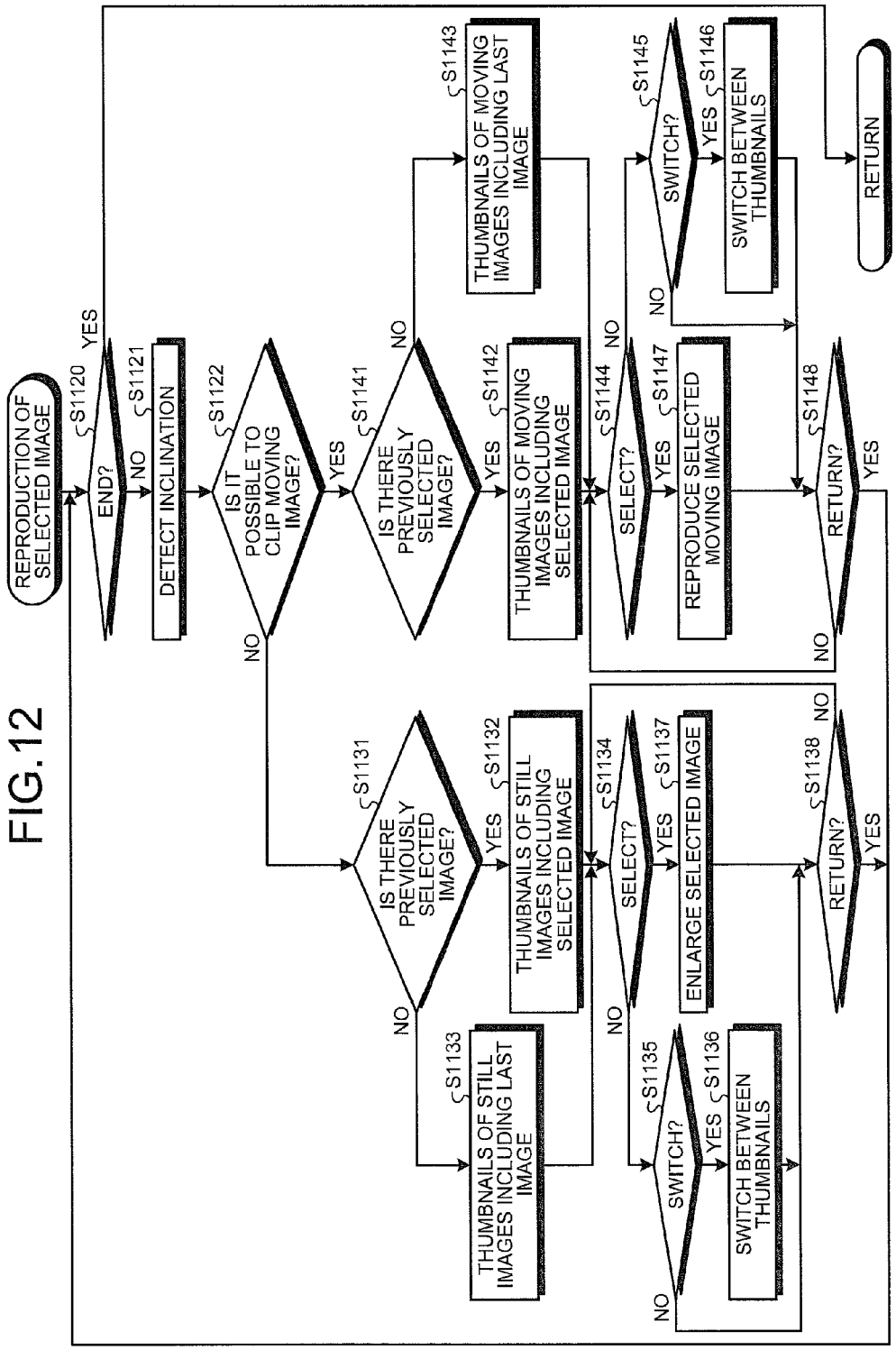
FIG. 12 is a flowchart of a selected-image reproducing process performed by the imaging apparatus according to the first embodiment of the present invention.

FIG. 12 is a flowchart representing an overview of a selected-image reproducing process in the digital camera 10 at Step S112 explained above. First, the digital camera 10 determines whether the reproducing mode is ended (Step S1120). When the reproducing mode is ended (YES at Step S1120), the digital camera 10 ends the selected-image reproducing process, returns to the main routine shown in FIG. 11, and proceeds to Step S113. If the reproducing mode is not ended (NO at Step S1120), the inclination detector 26 constantly detects an inclination of the digital camera 10 around the shooting optical axis (Step S1121). The central control circuit 14 determines whether the inclination angle falls within a predetermined angle range in which the moving image can be clipped, based on the result of detection at Step S1121 (Step S1122).

First, a case in which the digital camera 10 is not inclined at the predetermined angle and it is determined by the central control circuit 14 that the inclination angle does not fall within the angle range in which the moving image can be clipped (NO at Step S1122) is explained below. In this case, at Step S1131, it is determined whether there is any previously selected image. If there is a previously selected image (YES at Step S1131), thumbnails (second thumbnails) of still images including images shot in the same period as that of the image are displayed (Step S1132). Meanwhile, if there is no previously selected image (NO at Step S1131), then thumbnails of still images including an image near to the shooting date and time, i.e., a still image which is last shot (last shot image) are displayed (Step S1133). At Steps S1132 and S1133, the entire surface of the display unit 16 is used to display the still image thereon.

If an image is selected after the thumbnails of still images are displayed at Step S1132 or S1133 (YES at Step S1134), the selected still image is enlarged for display by the display unit 16 (Step S1137).

Thereafter, if the display of the still images is ended and the process returns (YES at Step S1138), then the process returns to Step S1120. Meanwhile, if the display of the still images is continued (NO at Step S1138), the process returns to Step S1134.

If an image is not selected at Step S1134 (NO at Step S1134), and when the display unit 16 switches the thumbnails displayed thereon to another ones (YES at Step S1135), the digital camera 10 switches the thumbnails to another ones and update them (Step S1136). Meanwhile, when the display unit 16 does not switch the thumbnails displayed thereon to another ones (NO at Step S1135), then the digital camera 10 proceeds to Step S1138.

When the digital camera 10 is inclined at the predetermined angle and it is determined by the central control circuit 14 that the inclination angle falls within the angle range in which the moving image can be clipped (YES at Step S1122), then the digital camera 10 reproduces the moving image. In this case, at Step S1141 following Step S1122, if there is a previously selected image (YES at Step S1141), thumbnails (first thumbnails) of moving images including an image shot in the same period as that of the image are displayed (Step S1142). Meanwhile, if there is no previously selected image (NO at Step S1141), then thumbnails of moving images including a moving image near to the shooting date and time, i.e., a moving image which is last shot (last shot image) are displayed (Step S1143).

If a moving image is selected after the thumbnails of moving images are displayed at Step S1142 or S1143 (YES at Step S1144), the selected moving image is reproduced by the display unit 16 (Step S1147).

Thereafter, if the display of the moving images is ended and the process returns (YES at Step S1148), then the process returns to Step S1120. Meanwhile, if the display of the moving images is continued (NO at Step S1148), the process returns to Step S1144.

If a moving image is not selected at Step S1144 (NO at Step S1144), and when the display unit 16 switches the thumbnails displayed thereon to another ones (YES at Step S1145), the digital camera 10 switches the thumbnails to another ones and update them (Step S1146). Meanwhile, when the display unit 16 does not switch the thumbnails displayed thereon to another ones (NO at Step S1145), then the digital camera 10 proceeds to Step S1148.

It should be noted that the thumbnails and the selected image in the display of the still images are displayed (enlarged) by using the entire surface of the display unit 16, while the thumbnails and the selected image in the display of the moving images are displayed (enlarged) in the limited screen area indicated by the frame 16*a* as shown in FIG. 4B and the moving image is reproduced therein.

In the selected-image reproducing process as explained above, at Step S1132, when still images are viewed after moving images of, for example, a foot race on an athletic meet are viewed, it is set so as to always include the images shot on the athletic meet in the still images. On the other hand, at Step S1142, when moving images are viewed after photos of, for example, the athletic meet as still images are viewed, it is set so as to enable the thumbnails of the moving images shot on the athletic meet to be viewed. More specifically, in the first embodiment, the mutual search for corresponding still image and moving image is easily carried out, and the still image and the moving image of the same event can be smoothly reproduced and displayed. Therefore, when a still image of the athletic meet shot long ago is finally found and it is desired to view a corresponding moving image, the moving image shot at that time can be speedily and easily found out with no stress. If the above mentioned device is not given, after the still images of the athletic meet are viewed, the moving images have to be found out by tracking the thumbnails intensely, which becomes quite troublesome.

In the first embodiment, by holding the digital camera 10 horizontally in the reproducing mode, the thumbnails of the still images are displayed on the display unit 16, while by rotating the digital camera 10 at a predetermined angle to be inclined, the thumbnails of the moving images are displayed thereon. More specifically, the photographer is conscious that an image to be reproduced is the still image or the moving image and can switch between the still-image display mode and the moving-image display mode according to the inclination of the display unit 16, and thus a search for a still image and a moving image can be easily performed from shot images as a mixture of still images and moving images.

For example, thumbnails of only still images can be displayed, thumbnails of only moving images can be displayed, or only a still image or only a moving image can be speedily and easily searched by selection. Therefore, enjoyment of reproducing and displaying the shot images is increased.

Moreover, in the moving-image display mode, the display unit 16 displays the moving image in the screen area corresponding to the aspect ratio for the moving image, and thus, the display of the moving image can be enjoyed without unnatural feeling.

Furthermore, because the initial mode is the shooting mode for the still image, under such a situation that even a time for mode switching to the moving-image mode should not be wasted, the still-image shooting allows quick responsivity to a photo opportunity.

Moreover, even after the mode is switched from the shooting mode for the still image to the moving-image mode, the mode switching between the moving-image mode and the still-image mode can be quickly performed corresponding to the attitude of the digital camera 10. From this point also, the still image and the moving image can be shot without missing a photo opportunity.

Furthermore, the mode switching between the still image and the moving image can be performed without operating any particular switch, and thus shooting can be carried out without paying attention to operation of any switch other than the release switch 28*a*.

Moreover, for example, only by inclining the digital camera 10 and performing a release operation, it becomes ready to shoot the moving image. Therefore, the photographer can switch between camera functions while checking a subject to be shot in the screen and concentrating on shooting without releasing the hand from the release switch 28*a*.

It is desired that shooting is carried out by simultaneous shooting of a still image and a moving image, still-image shooting, or moving-image shooting, and an image recorded on the recording unit is efficiently reproduced on the liquid crystal display (display unit). Therefore, there is known an image data management device that adds a keyword to image data for management and searches for the image data using the keyword as a key (e.g., Japanese Laid-open Patent Publication No. 2007-102290). In Japanese Laid-open Patent Publication No. 2007-102290, a condition parameter is added to image data, and a keyword of the image data is estimated based on its compatibility with a distribution tendency of condition parameters for sample image data.

For reproduction, a method of displaying a large number of mixed images in the form of a list as thumbnails and enlarging a selected image for display is generally adopted. However, the still image such that a subject to be shot is momentarily clipped and the moving image such that a movement of a subject to be shot is enjoyed are used in many cases for different purposes. Therefore, if the photographer is conscious that an image to be reproduced is the still image or the moving image to switch between the still image and the moving image, and if only the still image or only the moving image is displayed in the reproducing mode, then searching also becomes easy, which is preferable.

However, in any one of a digital camera or the like being a display unit with the imaging apparatus and of display units for reproduction only such as a photo storage viewer and a digital photo frame, it is not configured so that the photographer is conscious of a type of an image to be reproduced in the reproducing mode to switch between the still image and the moving image and only the still image or only the moving image is thereby displayed. The same goes for image display of mobile phones.

On the other hand, in the first embodiment, the photographer is conscious that an image to be reproduced is the still image or the moving image and can switch between the still-image display mode and the moving-image display mode according to the inclination of the digital camera 10. Therefore, a search for a still image and a moving image can be easily carried out from shot images as a mixture of still images and moving images. Moreover, a mutual search for corresponding images of a still image and a moving image is easily carried out from shot images as a mixture of still images and moving images, so that corresponding still image and moving image can be smoothly reproduced and displayed.

In the first embodiment, it is possible to switch between the moving-image mode and the still-image mode and to switch between the still-image display mode and the moving-image display mode corresponding to how to hold the digital camera 10. However, the switch group 28 of the digital camera 10 includes a menu key, a decision key (OK key), and a mode key, and thus, the mode switching may be carried out through operation of these switches. Therefore, the photographer can select either one of the mode switching performed by rotating and inclining the digital camera and the mode switching through the switch operation.

For example, a switch for turning ON and OFF a function of the inclination detector 26 may be provided. If a normal ON switch for automatically turning ON in response to turning ON of the power switch is applied to the switch, by switching the switch to be OFF, the still-image mode is set as an initial mode. In this case, it may be configured to perform the mode switching from the still-image mode to the moving-image mode through an operation of the mode key or the like. For example, by operating the menu key, the decision key (OK key), or the mode key, the mode switching from the still-image mode to the moving-image mode is simply selected, or any one of a forced mode and a non-forced mode of a strobe, a closeup mode, and a distant view mode being lower-order modes is also simply selected.

Similarly, switching the image to be reproduced between moving and still images according to the detected inclination of the digital camera 10 is applicable to the reproducing mode.

In FIG. 9, the inclination in the case of clipping an image with the aspect ratio of 16:9 from the imaging element 12*b* with the aspect ratio 4:3 for obtaining a moving image has been explained. However, the first embodiment can be applied to an imaging element with any aspect ratio other than this, and can also be compatible with a display unit with any aspect ratio other than a high-definition TV size.

In general, a universal equation for clipping an image with an aspect ratio of H:T from an imaging element with an aspect ratio of X:Y is as follows. If the numerical values in Equations (1) to (5) related to FIG. 9 are replaced in the following manner: 4 with X, 3 with Y, 16 with H, and 9 with T, then Equations (1) to (5) become Equations (11) to (15) as follows respectively.

$$H \cdot p + T \cdot q = X \quad (11)$$

$$T \cdot p + H \cdot q = Y \quad (12)$$

$$q = (T \cdot X - H \cdot Y)/(T \cdot T - H \cdot H) \quad (13)$$

$$p = (T \cdot Y - H \cdot X)/(T \cdot T - H \cdot H) \quad (14)$$

$$q/p = (T \cdot X - H \cdot Y)/(T \cdot Y - H \cdot X) \quad (15)$$

Therefore, an angle θ at the time of moving-image shooting in this case, $$\theta = \arctan((T \cdot X - H \cdot Y)/(T \cdot Y - H \cdot X)) \quad (16)$$

An imaging apparatus according to a second embodiment of the present invention includes a control unit that performs switching control from an initial simultaneous shooting mode of the still image and the moving image to the still-image mode or to the moving-image mode according to an inclination of the imaging apparatus for a predetermined time detected by an inclination detector in a shooting ready state. The control unit returns the mode to the initial simultaneous shooting mode if a switch for shooting is not operated even if the switching to the still image or to the moving image is performed. And under the situation in which the still-image mode and the moving-image mode are set, the control unit controls mode switching between the still-image mode and the moving-image mode according to an inclination of the imaging apparatus for a predetermined time detected by the inclination detector.

Figure 13:
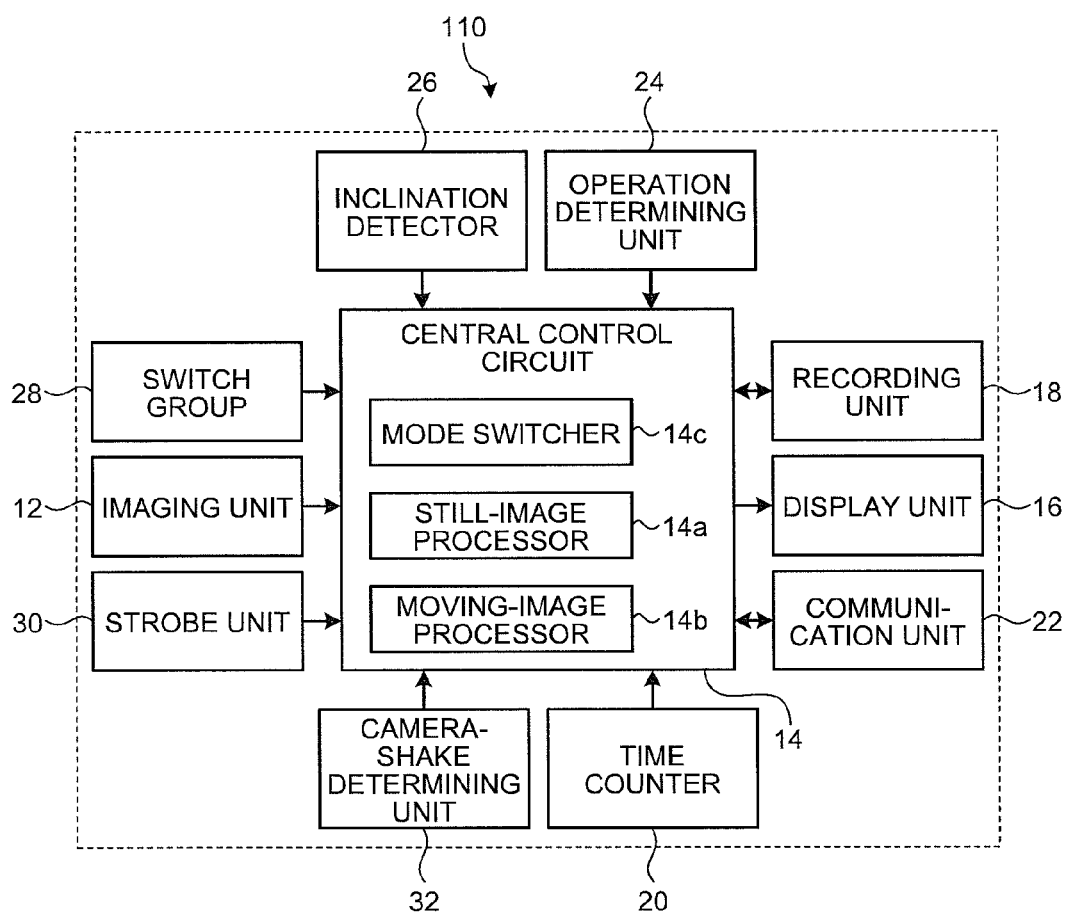
FIG. 13 is a schematic block diagram of a main portion of an imaging apparatus according to a second embodiment of the present invention.

FIG. 13 is a schematic block diagram of a main portion of the imaging apparatus according to the second embodiment of the present invention which is embodied as a digital camera. As shown in FIG. 13, a digital camera (imaging apparatus) 110 is configured to include the imaging unit 12, the central control circuit 14, the display unit 16, the recording unit 18, the time counter 20, the communication unit 22, the operation determining unit 24, the inclination detector 26, the switch group 28, a strobe unit 30, and a camera-shake determining unit 32 for determining whether there is camera shake. The camera-shake determining unit 32 is implemented by using a camera-shake sensor including, for example, a gyro.

Emission of the strobe unit 30 being an auxiliary light-emitting unit that illuminates a subject to be shot is controlled by the central control circuit 14. The central control circuit 14 not only determines whether the strobe unit 30 is caused to emit light for shooting according to brightness of the subject, but also causes the strobe unit 30 to forcibly emit light or controls a mode of turning off the emission according to the result of detection of the inclination of the digital camera 110. In the case of moving-image shooting, however, a pulsed strobe light cannot continuously illuminate the subject, and thus a light-emitting diode (LED) or the like is preferably used as an auxiliary light.

Figure 14A:
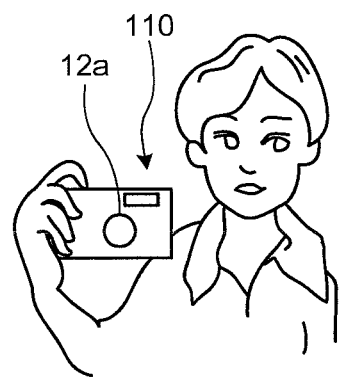
FIGS. 14A and 14B are schematics illustrating ways to shoot when the imaging apparatus according to the second embodiment of the present invention is held in a horizontal or inclined attitude.
Figure 14B:
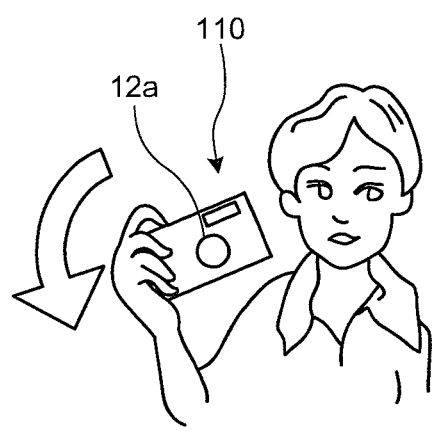

FIGS. 14A and 14B are schematics illustrating ways to shoot when the digital camera 110 is held in the horizontal or inclined attitude. When the power switch (power-supply switch) for the digital camera 110 is operated to turn the power ON, the simultaneous shooting mode in which the still image and the moving image are simultaneously shot is set as an initial mode. Therefore, if the photographer carries out shooting while holding the digital camera 110 in the horizontal attitude as shown in FIG. 14A, the digital camera 110 shoots a still image and also shoots a moving image. However, the simultaneous shooting of the still image and the moving image by the digital camera 110 causes image data to increase, and thus arrangement of the images becomes complicated. In the second embodiment, therefore, when the photographer inclines the digital camera 110 as shown in FIG. 14B, it is selectable whether the mode is switched to the still-image mode to shoot only a still image or is switched to the moving-image mode to shoot only a moving image.

Figure 15A:
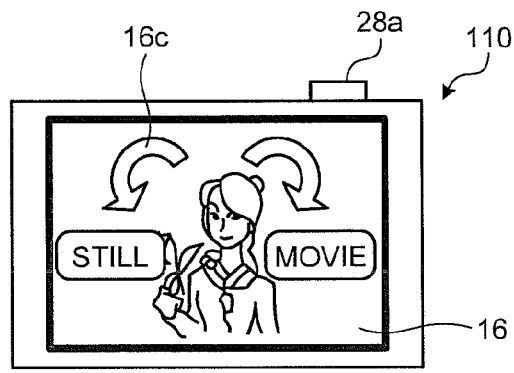
FIGS. 15A to 15C are schematics illustrating live view images on a liquid crystal display when the imaging apparatus according to the second embodiment of the present invention is held in the horizontal or inclined attitude.
Figure 15B:
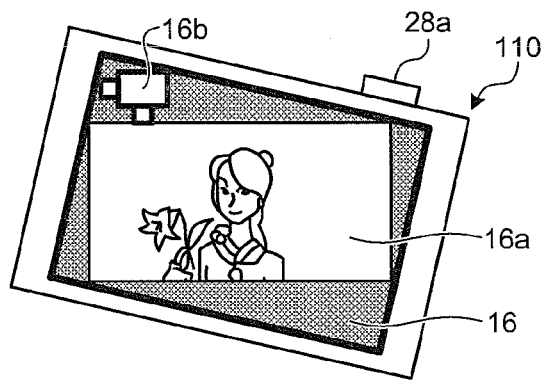
Figure 15C:
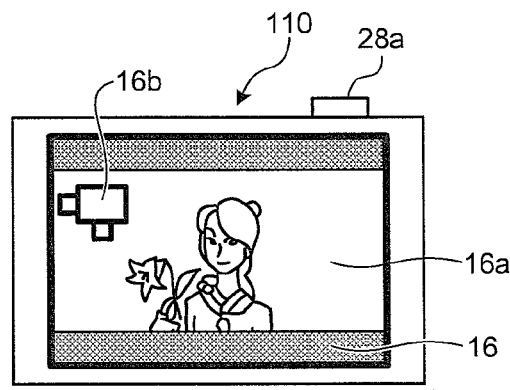

FIGS. 15A to 15C are schematics illustrating live view images on the display unit when the digital camera 110 is held in the horizontal or inclined attitude.

When the power switch is switched on (turned on) and the digital camera 110 is held horizontally (in a lateral attitude), the entire surface of the landscape-oriented display unit 16 is used to display the live view image thereon as shown in FIG. 15A. A mode sign 16c indicating a rotation direction (inclination direction) combined with the live view image (subject image) is displayed on the display unit 16. The rotation mentioned here represents that the digital camera 110 is rotated to be inclined from the state shown in FIG. 15A to the state shown in FIG. 15B. More specifically, the rotation represents that the digital camera 110 is rotated clockwise (counterclockwise when viewed from the subject side) to be inclined around the optical axis of the shooting lens 12a when viewed from the photographer.

The mode sign 16c is preferably a display combining a sign of a mode (still-image mode or moving-image mode) switched from the simultaneous shooting mode for simultaneously shooting the still image and the moving image with a sign of a rotation direction (inclination direction) of the digital camera 110. By displaying the mode to be switched together with the rotation direction, the photographer can recognize a rotation direction for a desired mode (still-image mode or moving-image mode) at a glance, and thus can speedily and easily carry out the mode switching from the simultaneous shooting mode.

For example, as shown in FIG. 15A, the central control circuit 14 provides control so as to set the mode to the moving-image mode if the digital camera 110 is rotated clockwise when viewed from the photographer, while to the still-image mode if the digital camera 110 is rotated counterclockwise when viewed from the photographer. When the digital camera 110 is rotated clockwise to be inclined when viewed from the photographer and is stopped, the inclination detector 26 detects an inclination (inclination angle, rotation angle) thereof. The operation determining unit 24 determines that the inclination angle detected by the inclination detector 26 exceeds a predetermined angle, and outputs the result of detection to the central control circuit 14, where either one of the still-image mode and the moving-image mode is set corresponding to the rotation direction. Here, θ given by Equation (6) or Equation (16) can also be applied to the predetermined angle.

In the moving-image mode obtained by rotating the digital camera 110 to be inclined, the display unit 16 is also inclined as shown in FIG. 15B, however, the frame 16a with the aspect ratio for the moving image appears on the display unit 16, and the screen of the display unit 16 is restricted so that the aspect ratio becomes 16:9 for the high-definition TV. The sign 16b indicating the moving-image mode is displayed on the margin portion (outside the frame 16a) of the display unit 16.

Even if the digital camera 110 is returned to the horizontal shooting attitude in order to shoot the moving image as shown in FIG. 15C, the frame 16a with the aspect ratio for the moving image is kept remaining on the display unit 16 and the sign 16b is also kept displayed thereon. It should be noted that if the digital camera 110 is held horizontally, the frame 16a is displayed horizontally without the margin portions remaining on both right and left edge portions of the screen of the display unit 16.

When the digital camera 110 is rotated counterclockwise when viewed from the photographer to be inclined and is stopped although not shown, the inclination detector 26 detects an inclination of the digital camera 110. It goes without saying that if the inclination angle exceeds a predetermined angle, the still-image mode is set. In the still-image mode also, a sign indicating the still-image mode may be displayed on the display unit 16, however, in the still-image mode, the still image is displayed on the entire screen of the display unit 16, and therefore the photographer can easily recognize the still-image mode without displaying the sign indicating the still-image mode thereon.

The operation determining unit 24 may erroneously determine a movement of the digital camera 110 (movement for composition switching) between shooting of a landscape-oriented composition when the digital camera 110 is held horizontally and shooting a portrait-oriented composition when the digital camera 110 is held vertically, as a movement of the digital camera 110 (movement for mode switching) when the mode switching is carried out from the simultaneous shooting mode to the still-image mode or to the moving-image mode by rotating the digital camera 110 around the shooting optical axis to be inclined from the horizontal position. Therefore, the central control circuit 14 controls so as not to perform the mode switching unless the state in which the digital camera 110 is kept inclined at an angle exceeding a predetermined angle is maintained for a predetermined time (e.g., about one second). Here, the predetermined angle is set to a value, for example, near 45 degrees.

FIGS. 16A to 16D illustrate changes of mode signs on the liquid crystal display.

Figure 16A:
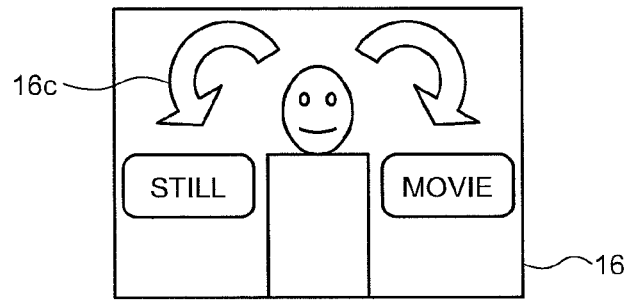
FIGS. 16A to 16D illustrate changes of mode signs on the display unit provided in the imaging apparatus according to the second embodiment of the present invention.

When the power switch is switched on and the digital camera 110 is held horizontally, the display unit 16 first displays, as shown in FIG. 16A, the live view image by using the entire surface thereof and also the mode signs 16c. Then, when the digital camera 110 is rotated and is kept inclined according to the mode sign 16c for the predetermined time, the still-image mode or the moving-image mode is selected.

It should be noted that the mode signs 16c shown in FIGS. 16A to 16D are called "mode signs A to D" respectively.

In the mode sign A (initial display) of FIG. 16A, the rotation directions (inclination directions) of the digital camera 110 are displayed together with the operating modes (still-image mode and moving-image mode) switched to each other according to the rotation direction. More specifically, in the mode sign A, a clockwise arrow and a character string "movie" near the point of the clockwise arrow are displayed, while a counterclockwise arrow and a character string "still" near the point of the counterclockwise arrow are displayed.

Figure 16B:
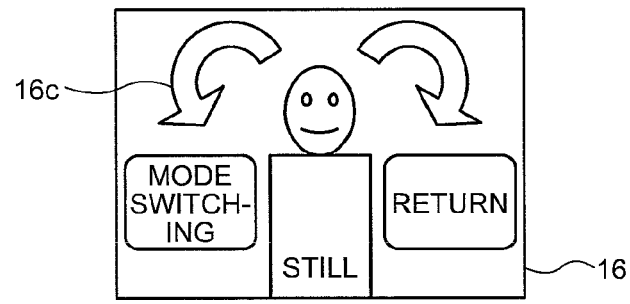

Thereafter, when the digital camera 110 is rotated counterclockwise when viewed from the photographer, to be kept inclined for the predetermined time, the digital camera 110 changes to the state switchable to the still-image mode, and the display unit 16 displays the mode sign B for the still-image mode as shown in FIG. 16B.

In the mode sign B for the still-image mode shown in FIG. 16B, rotation directions and contents of operations corresponding to the respective rotation directions are displayed, and the character string "still" indicating the still-image mode is also displayed. More specifically, in the mode sign B, the counterclockwise arrow and a character string "mode switching" near the point of the counterclockwise arrow are displayed, while the clockwise arrow and a character string "return" near the point of the clockwise arrow are also displayed. When the digital camera 110 is returned to the horizontal state (corresponding to the inclination angle θ=0) after a predetermined time has elapsed since switching of the sign on the display unit 16 to the mode sign B, the switching to the still-image mode is determined. It should be noted that when the inclination is detected within the predetermined angle including the horizontal state, the switching to the still-image mode may be determined.

In the second embodiment, as a lower-order mode of the still-image mode, a strobe ON mode (ST ON; forced light-emitting mode) for causing the strobe unit 30 to forcefully emit light and a strobe OFF mode (ST OFF; non-light-emitting mode) for turning OFF light emission according to brightness of the subject (forced stop; non-light emission) can be selected. Therefore, in the state in which the mode sign B is displayed, when the digital camera 110 is further rotated counterclockwise to be kept inclined for the predetermined time, the digital camera 110 changes to the state switchable to the lower-order mode, where the mode sign C shown in FIG. 6C is displayed on the display unit 16.

In the mode sign C, the arrow rotating counterclockwise and a character string "ST ON" (indicating switching to the strobe ON mode) near the point of the counterclockwise arrow are displayed, while the arrow rotating clockwise and a character string "ST OFF" (indicating switching to the strobe OFF mode) near the point of the clockwise arrow are also displayed.

When the digital camera 110 is returned to the horizontal state after a predetermined time has elapsed since switching of the sign on the display unit 16 to the mode sign C, the state switchable to the lower-order mode is determined while the state of displaying the mode sign C is maintained. More specifically, the digital camera 110 is returned once to the horizontal state, and a display content of the mode sign C is thereby determined, so that the switching to the lower-order mode can be performed.

Therefore, if the digital camera 110 is further rotated afterward, then the operating mode is switched according to the rotation. For example, if the digital camera 110 is rotated counterclockwise when viewed from the photographer to be inclined and the inclined state is maintained for a predetermined time, then the mode sign D indicating the strobe ON mode is displayed as shown in FIG. 16D. More specifically, in the mode sign D, the arrow rotating clockwise and the character string "return" near the point of the clockwise arrow are displayed in addition to the sign "ST ON" indicating that the mode is set to the strobe ON mode.

Thereafter, when the digital camera 110 is returned to the horizontal state, the switching to the strobe ON mode is determined in the digital camera 110.

Figure 16C:
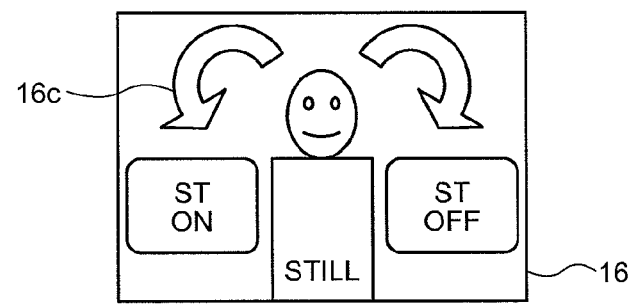
Figure 16D:
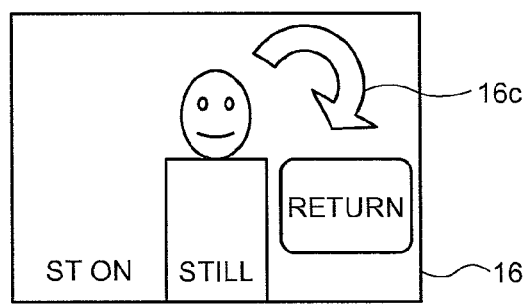

It should be noted that the character string "still" indicating the still-image mode is continuously displayed as shown in FIGS. 16B to 16D as long as the still-image mode is selected. Moreover, in the mode signs B, C, and D, the photographer operates the release switch 28a, and a still image is shot according to the operating mode.

In addition, the mode signs A to D on the display unit 16 are one examples, and thus the mode signs are not limited thereto. For example, a character string "forced light emission" may be displayed instead of displaying the character string "ST ON". Furthermore, "icon with a cross mark overlaid on a lightning mark" may be displayed instead of displaying the character string "ST OFF".

Moreover, the two modes (strobe ON mode and strobe OFF mode) related to the strobe emission are set as the lower-order modes of the still-image mode, however, the lower-order mode is not limited to the modes related to the strobe emission. More specifically, a closeup shooting mode and a distant-view shooting mode or the like may be set as the lower-order mode, or a continuous shooting mode, exposure control, and an image quality mode, or the like may be set as the lower-order modes.

In the moving-image mode, similarly to the still-image mode, the strobe ON mode, the strobe OFF mode, the closeup shooting mode, the distant-view shooting mode, an exposure control mode, and the image quality mode, or the like may be set as the lower-order modes. Furthermore, in the moving-image mode, it can be considered that a switching mode of the aspect ratio of an image is also set as the lower-order mode.

If the exposure control mode, the image quality mode, and the switching mode of the aspect ratio or the like are set as the lower-order modes so as to be switchable to one another, then an image with appropriate exposure and image quality can be shot. In addition, by setting the aspect ratios as the lower-order modes so as to be switchable to one another, any aspect ratio suitable for the display (reproduction) of an external TV or the like is selected and a moving image therewith can be shot.

FIG. 17 is a flowchart of shooting control by the digital camera 110 according to the second embodiment. First, the digital camera 110 determines an operating state of the power switch (power-supply switch) at Step S200, and ends the process if the power switch is not ON-operated (NO at Step S200), while proceeds to Step 201 if the power switch is ON-operated (YES at Step S200) and determines whether the operating mode is the shooting mode.

Processes at Steps S211 to S214 subsequently performed after it is determined that the operating mode is not the shooting mode at Step S201 (NO at Step S201) correspond sequentially to the processes at Steps S111 to S114 in FIG. 11.

At Step S201, if it is determined that the operating mode is the shooting mode (YES at Step S201), then the display unit 16 displays the live view image, and the camera-shake determining unit 32 determines whether there is camera shake (Step S202). Thereafter, the central control circuit 14 sets the simultaneous shooting mode as the initial mode of the operating mode (Step S203).

At Step S202, if it is determined by the camera-shake determining unit 32 that there is no camera shake and the image is in a stable state (YES at Step S204), the display unit 16 displays the mode sign A (see FIG. 16A), and the inclination detector 26 detects and determines an inclination of the digital camera 110 (Step S205).

In the second embodiment, if the digital camera 110 is set to the simultaneous shooting mode, and, as shown in FIG. 16A, when the digital camera 110 is returned to the horizontal state after a predetermined time has elapsed in the state in which the digital camera 110 is rotated rightward (clockwise) when viewed from the photographer to be kept inclined (YES at Step S221), the central control circuit 14 switches the operating mode to the moving-image mode. Meanwhile, when the digital camera 110 is returned to the horizontal state after the predetermined time has elapsed in the state in which the digital camera 110 is rotated leftward (counterclockwise) when viewed from the photographer to be kept inclined (NO at Step S221, YES at Step S223), the central control circuit 14 switches the operating mode to the still-image mode. In addition, if the digital camera 110 is not rotated (NO at Step S221, NO at Step S223), then the simultaneous shooting mode is maintained.

If the release switch 28*a* is switched on in a state in which the operating mode is switched or maintained (YES at Step S231), then the imaging unit 12 performs shooting in the set operating mode (Step S232).

When the moving image is to be shot at Step S232, the operation of the release switch 28*a* is determined. If it is determined that the release switch 28*a* is operated again, then the moving-image shooting is ended and the process returns to Step S200. Meanwhile, when the moving image is shot at Step S232 and the release switch 28*a* is not operated again, then the moving-image shooting is continued. The moving-image shooting requires a complicated image process accompanying inter-frame compression. Therefore, the second embodiment is configured so that some pixels are thinned out of pixels in the imaging element 12*b* or are summed so as to reduce the number of pixels as small as possible, and that only an image signal for the pixels equivalent to the image quality of the high-definition TV is input to the moving-image processor 14*b* of the central control circuit 14.

Next, a case in which still-image shooting is performed at Step S232 is explained below. In this case, for example, 10 M pixels are used as they are to compress image data so that the image quality is satisfactory for a poster size, and the compressed image data is recorded on the recording unit 18. When the shooting of the still image at Step S232 is ended, the process returns to Step S200.

If the switch operation is not performed at Step S231 (NO at Step S231), then the switched mode sign is displayed on the display unit 16 (Step S233). Thereafter, when the digital camera 110 is held horizontally after being inclined at a predetermined angle for a predetermined time (YES at Step S234), the mode switches 14*c* performs mode switching to the setting for the inclined side (Step S235), and the process returns to Step S231. For example, in the still-image mode, switching to the lower-order mode is possible. The mode signs A to D respectively shown in FIGS. 16A to 16D are displayed on the display unit 16, and a desired lower-order mode (here, forced light-emitting mode or non-light-emitting mode) is selected and a still image is shot.

When it is determined that the operation of holding the digital camera horizontally is not performed after it is kept inclined at the predetermined angle for the predetermined time at Step S234 (NO at Step S234) and if it is determined that the release switch 28*a* is not operated for a predetermined time (YES at Step S236), the process returns to Step S200. When a non-operation time of the release switch 28*a* does not reach the predetermined time at Step S236 (NO at Step S236), the process returns to Step S234.

The flowchart of the shooting control shown in FIG. 17 is one example, and thus it goes without saying that the shooting control according to the second embodiment is not limited thereto. For example, after the condition for switching to the moving-image mode is determined (Step S221), the process proceeds to Step S223 at which the condition for switching to the still-image mode is determined, and thus, the switching to the moving-image mode is preferentially performed. However, contrary to this, the switching to the still-image mode may be preferentially performed, and after the condition for switching to the still-image mode is determined, the process may proceed to a step of determining the condition for switching to the moving-image mode.

According to the second embodiment as explained above, it is possible to switch from the simultaneous shooting mode to the moving-image mode or to the still-image mode corresponding to an attitude of the digital camera 110 (a series of attitudes in such a manner that it is rotated to be inclined in a predetermined direction and is returned to the horizontal state), and only by holding the digital camera 110, a desired subject to be shot can be shot as a still image or as a moving image without missing a photo opportunity.

Moreover, the mode switching between the still-image mode and the moving-image mode can be performed while the digital camera 110 is held by one hand, and thus, even if a photographer is holding something (light, stock, or pickel) by the other hand or even if the photographer does not smoothly carried out a fine operation because of wearing gloves, like in cases of underwater photography and photography of mountains in the snow, the moving-image shooting and the still-image shooting can be carried out by one-handed operation without any trouble.

In addition, because the initial mode is the simultaneous shooting mode, under such a situation that even a time for mode switching to the moving-image mode or to the still-image mode should not be wasted, the simultaneous shooting of the still image and the moving image allows quick responsivity to a photo opportunity.

Furthermore, the mode switching from the moving-image mode or from the still-image mode to a lower-order mode such as a strobe light-emitting mode (forced light-emitting mode, non-light-emitting mode), the closeup mode, and the distant view mode can be performed in response to how to hold the digital camera 110. Therefore, only by holding the digital camera 110 by one hand, the lower-order mode such as the strobe light-emitting mode, the closeup mode, and the distant view mode can be easily set, and thus the still image and the moving image can be shot by one-handed operation under various shooting conditions.

Furthermore, it is possible to perform the mode switching between the still-image mode and the moving-image mode or perform switching to the lower-order mode without any switch operation, and thus the photographer does not need to pay attention to operation of any switch other than the release switch 28*a* and can concentrate on the operation of the release switch 28*a* for shooting.

Moreover, only by inclining the digital camera 110, it becomes ready to shoot a moving image, and a screen area corresponding to the aspect ratio for the moving image is displayed in the moving-image mode, and thus, the moving image can be shot without unnatural feeling.

As explained above, according to the second embodiment, the moving-image mode and the still-image mode are switched to each other corresponding to an attitude of the imaging apparatus and also switched to various types of lower-order mode related to shooting. Therefore, an important subject to be shot can be shot as a still image or as a moving image under optimal conditions without missing a photo opportunity.

It should be noted that it may be configured so that even after the operating mode is switched from the simultaneous shooting mode to the moving-image mode or to the still-image mode, the mode switching between the moving-image mode and the still-image mode is performed corresponding to an attitude of the digital camera 110, and the mode switching from the moving-image mode to the still-image mode or the mode switching from the still-image mode to the moving-image mode may be performed without returning to the initial mode (simultaneous shooting mode). This allows rapid mode switching to any other mode, even after switching to the still-image mode or to the moving-image mode, different from the switched mode only by holding the digital camera 110. Therefore, the still image and the moving image can be shot without missing a photo opportunity.

An imaging apparatus according to a third embodiment of the present invention includes a control unit that performs switching control for a shooting mode between the still-image mode and the moving-image mode according to an inclination of the imaging apparatus detected by an inclination detector upon operation of a release switch. The control unit switches the mode from the still-image mode being the initial setting to the moving-image mode when the inclination of the imaging apparatus detected by the inclination detector exceeds a predetermined value. In addition, the control unit starts moving-image shooting in response to release of the inclination of the imaging apparatus.

The imaging apparatus according to the third embodiment is embodied as a digital camera. This digital camera has a configuration the same as that of the digital camera 110 explained in the second embodiment. Therefore, the same signs as these in the digital camera 110 and the components thereof are assigned to the digital camera being the imaging apparatus according to the third embodiment and the components thereof.

The third embodiment is characterized significantly in that switching between shooting modes such as the still-image mode and the moving-image mode is performed according to the result of output of the inclination detector 26 upon operation of the release switch 28a. An inclination of the digital camera 110 upon operation of the release switch 28a, which is detected by the inclination detector 26, is output to the central control circuit 14, where the mode switcher 14c determines which of a still-image process and a moving-image process is to be performed. If it is determined that the moving-image process is to be performed, then a shot image is processed by the moving-image processor 14b, and if it is determined that the moving-image process is not to be performed, then a shot image is processed by the still-image processor 14a, and the processed image is recorded on the recording unit 18.

In the digital camera 110 according to the third embodiment, processes such as switching between the still-image mode and the moving-image mode and shooting are performed according to an inclination of the digital camera 110 from a predetermined position when it is held and an operation of the release switch 28a.

The processes according to an inclination of the digital camera 110 and an operation of the release switch 28a are explained below with reference to FIGS. 18A to 18E. The photographer operates the release switch 28a while holding the digital camera 110 horizontally, and the still-image mode is set as the initial mode.

Figure 18A:
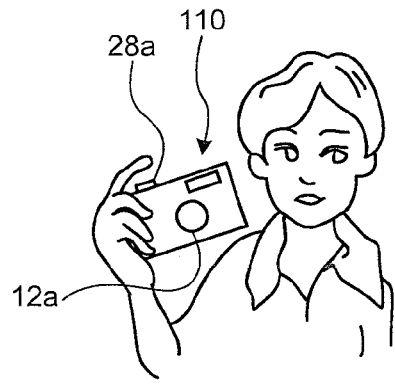
FIGS. 18A to 18E are schematics for explaining a process according to an inclination of an imaging apparatus according to a third embodiment of the present invention and an operation of a release switch thereof.
Figure 18B:
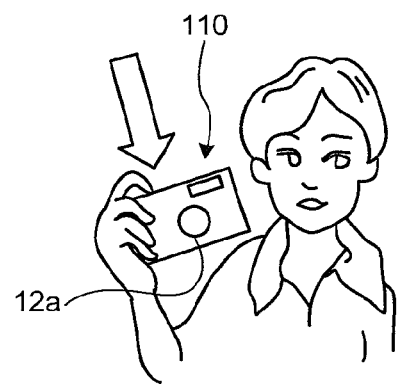
Figure 18C:
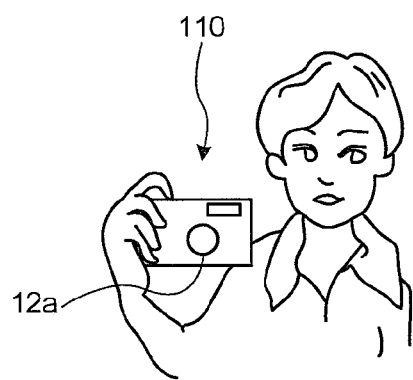
Figure 18D:
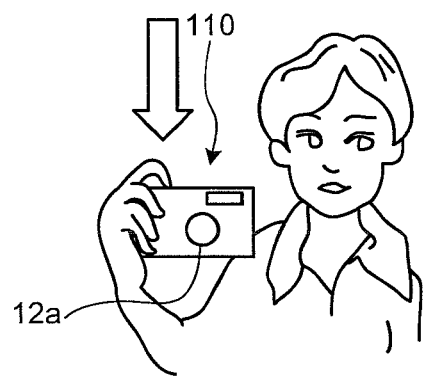

Thereafter, the digital camera 110 is inclined at a predetermined angle for a predetermined time and the state is changed to a switchable state as shown in FIG. 18A, and then, when the release switch 28a is pressed as shown in FIG. 18B, the mode switches 14c performs switching from the still-image mode to the moving-image mode.

When shooting is started while the digital camera 110 is kept inclined, a shot image becomes an inclined image. Therefore, in the third embodiment, when the digital camera 110 is returned to the horizontal state (corresponding to inclination angle θ=0) while the release switch 28a is kept pressed (see FIG. 18C), the central control circuit 14 causes the imaging unit 12 to start shooting. It should be noted that if the inclination is detected within the predetermined angle range including the horizontal state, switching to the still-image mode may be determined.

As an inclination of the digital camera 110 at which switching from the still-image mode to the moving-image mode is possible, θ expressed by Equation (6) or Equation (16) can be applied. When a predetermined time has elapsed in a state in which the inclination exceeds the inclination angle θ and the release switch 28a is operated, the operating mode is thereby switched to the moving-image mode. Thereafter, when the digital camera 110 is returned to the horizontal state, then moving-image shooting is started at once.

As explained above, in the third embodiment, even if the release switch 28a is pressed, the shooting is not started until the digital camera 110 is returned to horizontal, and this causes a slight time lag. However, the time lag is a time as short as about 0.1 second, and moving-image shooting requires generally at least several seconds for shooting, and thus, there is no harm in ignoring an initial time lag of about 0.1 second as an error range.

In case a time lag of about 0.1 second bothers the photographer, he or she simply switches a mode key for switching between the shooting modes to the moving-image mode for shooting. More specifically, by switching OFF an ON/OFF switching switch in the inclination detector 26, in which it is generally set to ON, and by switching the mode key to the moving-image mode, the moving-image shooting is started at once in response to pressing of the release switch 28a, and shooting is possible with no time lag after the operation of the release switch 28a.

The reason why the shooting is not started when the digital camera 110 is kept inclined and a diagonal moving image is not shot is because when a video is reproduced on an external display unit such as high-definition TV and if the shot moving image is diagonal, then it is unnatural and hard to view.

Figure 18E:
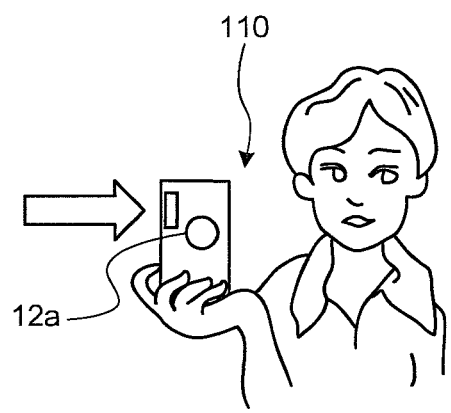

When not a moving image but a still image is to be shot, the digital camera 110 is returned to horizontal and the inclination is released without pressing the release switch 28a while the digital camera 110 is inclined, and then the release switch 28a is simply pressed. Further, as shown in FIG. 18E, if the photographer holds the digital camera 110 vertically and then presses the release switch 28a, then a still image can also be shot at once.

Shooting without missing a momentary photo opportunity is important for shooting of a still image, and by pressing the release switch 28a while the digital camera 110 is kept held horizontally or vertically, a still image is shot and a time lag can thereby be reduced to a minimum.

It should be noted that it may be configured to release once the release switch 28a before the digital camera 110 is returned to the horizontal state from the state shown in FIG. 18B, return the digital camera 110 to the horizontal state to release the inclination, and then operate the release switch 28a again to thereby determine the moving-image mode, and start moving-image shooting. Moreover, it may be configured to determine the moving-image mode when the digital camera 110 is returned to horizontal so that the inclination is released, to start moving-image shooting at once.

In either case, the photographer simply selects which of operations of the release switch 28a for starting the moving-image shooting. Such switching can be appropriately set under control of the central control circuit 14 according to an operation of a touch panel or an arrow key and so forth provided in the digital camera 110.

Figure 19A:
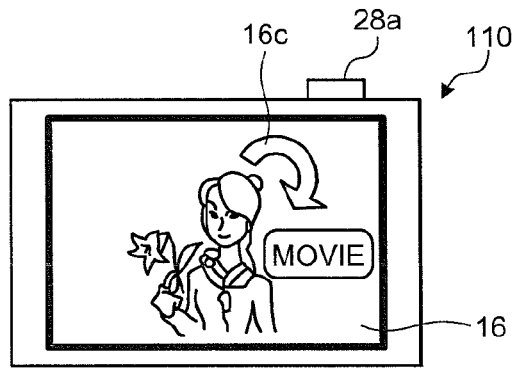
FIGS. 19A to 19C are schematics illustrating display examples of live view images on a display unit when the imaging apparatus according to the third embodiment of the present invention is held in the horizontal or inclined attitude.
Figure 19B:
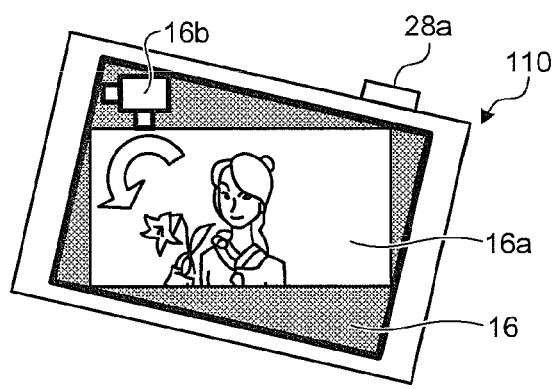
Figure 19C:
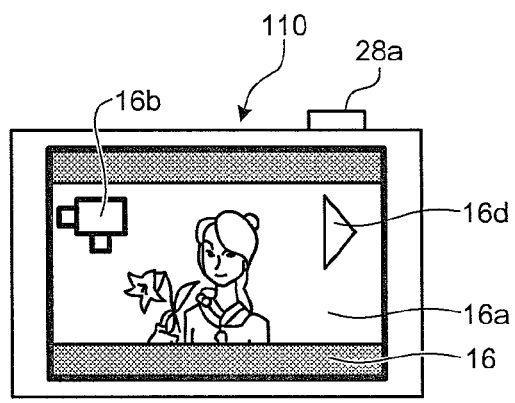

FIGS. 19A to 19C illustrate live view images on the display unit 16 when the digital camera 110 is held in the horizontal or inclined attitude.

When the power switch is switched on to turn the power on and the digital camera 110 is held horizontally, the entire surface of the landscape-oriented display unit 16 is used to display the live view image thereon as shown in FIG. 19A. The mode sign 16c indicating a rotation direction (inclined direction) is displayed on the display unit 16 in combination with the live view image. The rotation mentioned here represents that the digital camera 110 is rotated around the optical axis of the shooting lens 12a to be inclined from the horizontal state (e.g., see FIG. 18A).

The mode sign 16c is preferably displayed by combining a display of a rotation direction of the digital camera 110 with a display of the moving-image mode (e.g., "movie") capable of switching when the digital camera 110 is rotated in the displayed rotation direction to be inclined. By displaying the rotation direction combined with a switchable mode (moving-image mode), the photographer can recognize the rotation direction for the moving-image mode at a glance.

For example, in the state shown in FIG. 19A, the photographer rotates the digital camera 110 clockwise to be inclined when viewed from the photographer, and the inclination detector 26 detects an inclination (inclination angle) of the digital camera 110. The operation determining unit 24 determines that the inclination angle detected by the inclination detector 26 exceeds a predetermined angle, and outputs the result of detection to the central control circuit 14. The central control circuit 14 provides control so that the state is changed to a switchable state in which switching to the moving-image mode is possible.

When the release switch 28a is pressed in a state in which the digital camera 110 is rotated to be inclined and the mode is thereby switched to the moving-image mode, the display unit 16 is also inclined as shown in FIG. 19B. Therefore, the display unit 16 displays the frame 16a for the moving image so as to have the aspect ratio of 16:9 for the moving image. In addition, the sign 16b indicating that the mode to be switched is the moving-image mode is displayed, for example, outside the area displaying the frame 16a.

When the release switch 28a is pressed in a state of inclining the digital camera 110 and the digital camera 110 is returned to the horizontal shooting attitude as shown in FIG. 19C and the inclination thereof is released, the moving-image shooting is started. Even if the digital camera 110 is returned to the horizontal shooting attitude to release the inclination thereof, the frame 16a for the moving image is kept remaining on the display unit 16 and the sign 16b is also kept displayed thereon.

When the digital camera 110 is returned to the horizontal shooting attitude and the display unit 16 is changed to horizontal, the frame 16a is displayed with a landscape-oriented composition without the margin portions remaining on both right and left edge portions of the display unit 16. However, margin portions still remain on both top and bottom edge portions, so that the screen of the display unit 16 becomes restricted (see FIG. 19C). As explained above, the widths in the upper and lower sides of an image displayed on the display unit 16 are restricted, but this allows the photographer to recognize that the current mode is the moving-image mode even if the sign 16b is not displayed.

In FIG. 19C, a triangular mark 16d is displayed on the display unit 16, and "in moving-image shooting" is thereby clearly specified. By blinking the triangular mark 16d, "in shooting" may also be emphasized.

In the still-image mode being the initial mode, a sign indicating the still-image mode may be displayed on the display unit 16. However, because the screen of the display unit 16 is not restricted in the still-image mode, it can be recognized without the sign that it is the still-image mode.

Figure 20:
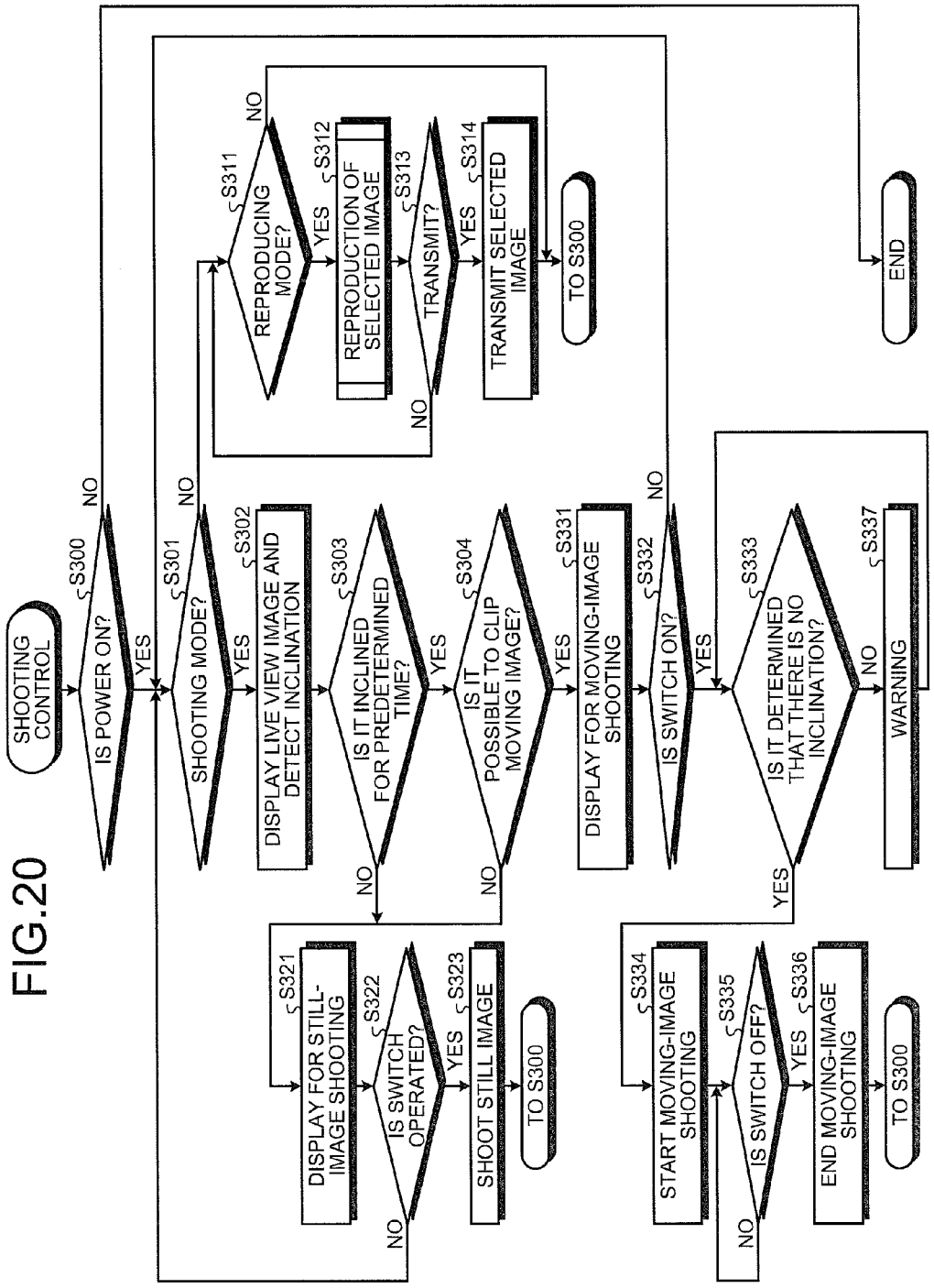
FIG. 20 is a flowchart of shooting control by the imaging apparatus according to the third embodiment of the present invention.

FIG. 20 is a flowchart of shooting control by the digital camera 110 according to the third embodiment. First, the digital camera 110 determines an operating state of the power switch (power-supply switch) at Step S300, and ends the process if the power switch is not ON-operated i.e., the power is turned OFF (NO at Step S300), while proceeds to Step S301 if the power switch is ON-operated (YES at Step S300) and determines whether the operating mode is the shooting mode.

At Step S301, if the operating mode is not the shooting mode (NO at Step S301), then subsequent processes at Steps S311 to S314 correspond sequentially to the processes at Steps S111 to S114 in FIG. 11.

At Step S301, if the operating mode is the shooting mode (YES at Step S301), then the display unit 16 displays the live view image, and the inclination detector 26 constantly detects an inclination of the digital camera 110 through the rotation around the shooting optical axis (Step S302). As a result of detection, when the digital camera 10 is continuously inclined for a predetermined time (YES at Step S303), and if the central control circuit 14 determines that the inclination angle falls within a predetermined angle range from an angle θ (or −θ) in which an aspect for the moving image can be clipped (YES at Step S304), then the display unit 16 performs a display for moving-image shooting as shown in FIG. 19B (Step S331).

If the inclination detected by the inclination detector 26 is not continuously kept for a predetermined time (NO at Step S303) or if the inclination angle does not fall within the angle range in which the aspect ratio for the moving image can be clipped (NO at Step S304), then subsequently performed processes at Steps S321 to S323 are still-image shooting processes corresponding sequentially to the processes at Steps S121 to S123 in FIG. 11.

The release switch 28a is operated (YES at Step S332) after the display for the moving-image shooting is performed at Step S331, and the mode can be switched to the moving-image mode, and the digital camera 110 is returned from the inclined state to horizontal and it is determined whether the digital camera 110 is inclined. If it is determined that the digital camera 110 is not inclined (YES at Step S333), the mode switcher 14c determines the switching to the moving-image mode, and the imaging unit 12 starts moving-image shooting (Step S334). Here, it is assumed that the digital camera 110 is returned to the horizontal state in a state in which the release switch 28a is continuously pressed.

When the state in which the digital camera 110 is kept inclined is continued (NO at Step S333) after the release switch 28a is turned ON at Step S332, then warning is output (Step S337). For example, as warning, a warning mark may be blinked on the screen of the display unit 16 or a warning may be sounded by providing a voice output unit.

When the release switch 28a is turned OFF (YES at Step S335) after the moving-image shooting is started at Step S334, the digital camera 110 ends the moving-image shooting (Step S336) and returns to Step S300. Meanwhile, when the release switch 28a is not turned OFF (NO at Step S335) after the moving-image shooting is started at Step S334, the digital camera 110 continues the moving-image shooting.

If it is configured to perform moving image shooting in such a manner that the photographer presses the release switch 28a in a state of inclining the digital camera 110, then turns OFF the release switch 28a before it is returned to the horizontal state, returns it to the horizontal state, and presses again the release switch 28a, then, it can be configured to end the moving-image shooting by further pressing the release switch 28a thereafter.

When the release switch 28a is not turned ON within a predetermined time at Step S332 (NO at Step S332), the digital camera 110 returns to Step S301. This corresponds to the case in which a shooting condition is changed. More specifically, if the digital camera 110 is returned to horizontal without pressing the release switch 28a even if the display for moving-image shooting is on the display unit 16, then the moving-image mode is not determined. In this case, at Step S304 subsequently performed, it is determined that the frame 16a with the aspect ratio for the moving image cannot be clipped, and thus, the digital camera 110 proceeds to Step S321, where the still-image shooting process is performed.

The moving-image shooting is usually performed with a landscape-oriented composition when the digital camera 110 is held horizontally, and thus, the moving-image shooting with a portrait-oriented composition is not usual. Therefore, if it is desired to shoot a moving image with the portrait-oriented composition, then shooting is started simply by, first, inclining the digital camera 110, returning it to the horizontal state, starting moving-image shooting, and then changing the way to hold the digital camera 110 to a vertical attitude.

As explained above, in the third embodiment, because the still-image mode and the moving-image mode are switched to each other according to the inclination of the digital camera 110 upon operation of the release switch 28a, a desired subject to be shot can be shot as a still image and a moving image without missing a photo opportunity.

Next, a digital camera (imaging apparatus) according to a fourth embodiment of the present invention is explained below. The imaging apparatus according to the fourth embodiment is embodied as a digital camera. The digital camera has the same configuration as that of the digital camera 110 explained in the second embodiment. Therefore, the same signs as these in the digital camera 110 and the components thereof are assigned to the digital camera being the imaging apparatus according to the fourth embodiment and the components thereof, respectively.

FIGS. 21A to 21E are schematics illustrating ways to switch among operating modes of the digital camera 110.

The fourth embodiment is different from the third embodiment in that the function of the release switch 28a is converted from its original function to a function of a mode switching switch according to an inclination of the digital camera 110 and an operation of the release switch 28a. Therefore, a conversion of the function of the release switch 28a different from that of the third embodiment will be mainly explained below.

Figure 21A:
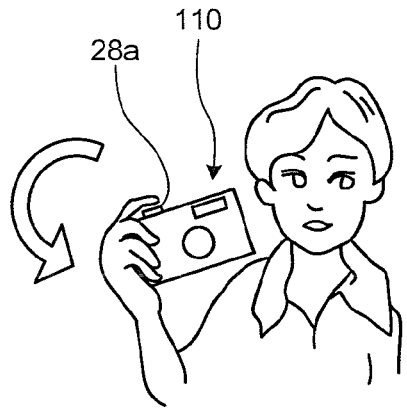
FIGS. 21A to 21E are schematics illustrating ways to switch among operating modes of an imaging apparatus according to a fourth embodiment of the present invention.
Figure 21B:
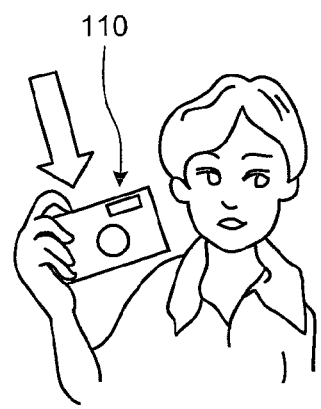
Figure 21C:
Figure 21D:
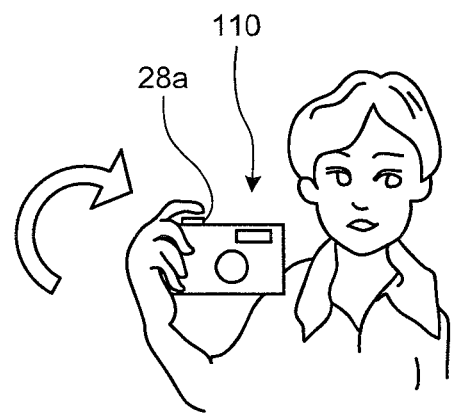
Figure 21E:
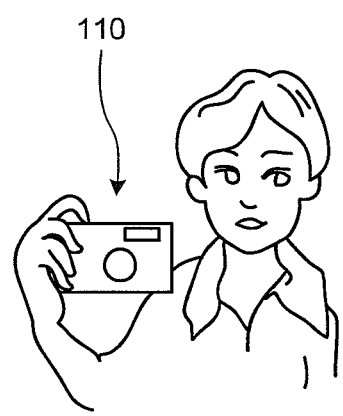

In the fourth embodiment, the photographer inclines the digital camera 110 at a predetermined angle to be in a switching ready state (see FIG. 21A). After the release switch 28a is pressed (see FIG. 21B), and when the release switch 28a is released (see FIG. 21C) in a state in which the digital camera 110 is kept inclined, the mode is switched from the still-image mode being the initial mode to the moving-image mode. Here, the predetermined angle should fall within a predetermined angle range. More specifically, when the photographer ON and OFF-operates the release switch 28a with the digital camera 110 kept inclined, the release switch 28a functions like the mode switching switch, and the moving-image mode is set. This is based on an idea that when the digital camera 110 is inclined, any composition other than the portrait-oriented composition is determined as inadequate for shooting, so that the function as a shooting switch is inhibited and is converted to any other function. However, the shooting in the moving-image mode is not yet started in a stage in which the release switch 28a is ON and OFF-operated by the photographer, and thus by returning the digital camera 110 to horizontal and turning ON the release switch 28a, the shooting in the moving-image mode is started.

The photographer switches ON and OFF the release switch 28a to switch to the moving-image mode and then returns the digital camera 110 from the inclined state to the horizontal state with no inclination thereof (see FIG. 21D), and the release switch 28a is thereby converted to the switch for shooting as the original function. Therefore, the release switch 28a is pressed at the horizontal position at which the inclination is released (see FIG. 21E), and the moving-image shooting is thereby started.

It can also be configured in such a manner that the photographer returns the digital camera 110 to the horizontal state to release its inclination, the switching to the moving-image mode is thereby immediately determined, and then the moving-image shooting is started. In this case, there is no need to operate the release switch 28a at the horizontal position where the inclination of the digital camera 110 is released.

The moving-image mode set by turning ON and OFF the release switch 28a with the digital camera 110 kept inclined is switched to the still-image mode being the initial mode through the following operation. Details of switching from the moving-image mode to the still-image mode are explained below with reference to FIGS. 22A to 22C.

Figure 22A:
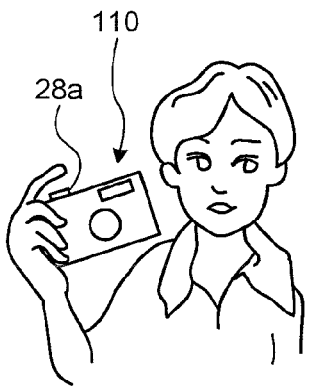
FIGS. 22A to 22C are schematics illustrating a way to switch from a moving-image mode to a still-image mode of the imaging apparatus according to the fourth embodiment of the present invention.
Figure 22B:
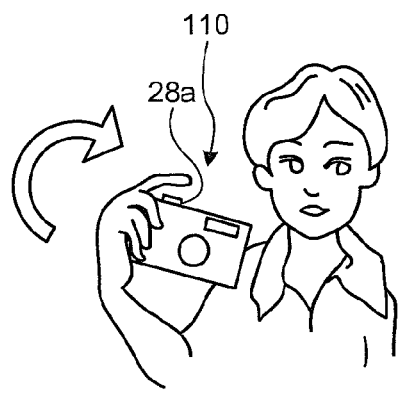
Figure 22C:
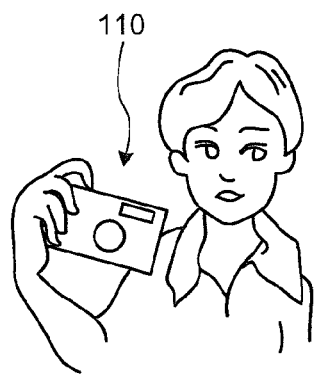

First, the photographer turns OFF the release switch 28a as shown in FIG. 22A, and then returns the digital camera 110 to the horizontal state with no inclination. Subsequently, as shown in FIG. 22B, the photographer rotates the digital camera 110 oppositely to the rotation for setting the moving-image mode (counterclockwise when viewed from the photographer), and inclines the digital camera 110 in the opposite direction. Thereafter, when the photographer presses the release switch 28a as shown in FIG. 22C, then the release switch 28a functions as the mode switching switch, and the moving-image mode is released to be switched to the still-image mode being the initial mode.

Figure 23A:
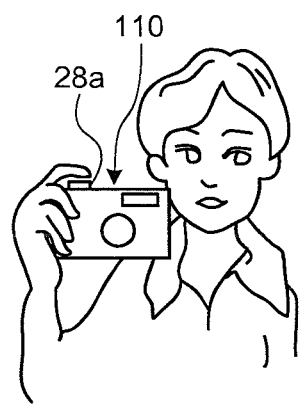
FIGS. 23A and 23B are schematics illustrating another way to switch from the moving-image mode to the still-image mode of the imaging apparatus according to the fourth embodiment of the present invention.
Figure 23B:
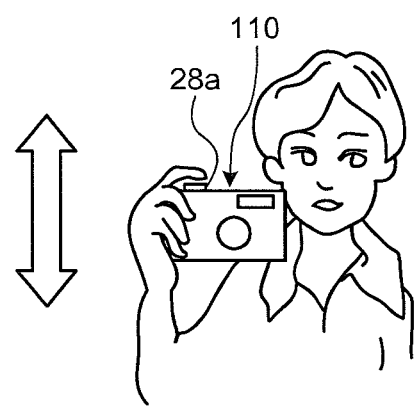

It should be noted that it may be configured so that the photographer shakes the digital camera 110 and the moving-image mode is thereby released. In this case, the photographer shakes the digital camera 110 from the horizontal state of thereof as shown in FIG. 23A to the vertical direction thereof as shown in FIG. 23B. The central control circuit 14 controls so as to determine the shake of the digital camera 110 based on a change of the output direction of the camera-shake determining unit 32 or the inclination detector 26, and release the moving-image mode to be switched to the still-image mode when a predetermined shake is detected.

In this manner, if it is configured to release the moving-image mode before shooting by an operation of shaking the digital camera 110, it is prevented that the moving-image mode is suddenly released during the moving-image shooting to result in shooting of an unintended still image.

It should be noted that the release of the moving-image mode shown in FIGS. 22A to 22C and 23A to 23B is exemplified, and thus a pattern of releasing the moving-image mode is not limited thereto. For example, it may be configured to switch from the moving-image mode to the still-image mode when the digital camera 110 is rotated to be inclined in a direction opposite to the direction of rotation thereof for setting the moving-image mode. This configuration does not require an operation of pressing the release switch 28a, and thus the switching from the moving-image mode to the still-image mode is performed only by one operation of inclining the digital camera 110 in the opposite direction.

A technological idea, in which the operation of the release switch 28a causes the functions to convert from the original function of the switch for shooting to the function of the mode switching switch under the inclination of the digital camera 110 and switching between the still-image mode and the moving-image mode is thereby performed, is extremely innovative. Therefore, a desired subject to be shot can be shot as a still image and a moving image without missing a photo opportunity.

FIG. 24 is a flowchart of shooting control by the digital camera 110 according to the fourth embodiment. First, the digital camera 110 determines an operating state of the power switch (power-supply switch) at Step S400, and ends the process if the power switch is not ON-operated i.e., the power is OFF (NO at Step S400), while proceeds to Step S401 if the power switch is ON-operated (YES at Step S400) and determines whether the operating mode is the shooting mode.

At Step S401, if the operating mode is not the shooting mode (NO at Step S401), then subsequent processes at Steps S411 to S414 correspond sequentially to the processes at Steps S111 to S114 in FIG. 11.

At Step S401, if the operating mode is the shooting mode (YES at Step S401), then the display unit 16 displays the live view image, and the inclination detector 26 constantly detects an inclination of the digital camera 110 through rotation around the shooting optical axis (Step S402). As a result of detection, when the digital camera 110 is continuously inclined for a predetermined time (YES at Step S403), and if the central control circuit 14 determines that the inclination angle falls within a predetermined range from an angle θ (or −θ) in which an aspect for the moving image can be clipped (YES at Step S404), then the display unit 16 performs a display for moving-image shooting as shown in FIG. 19B (Step S431).

If the inclination detected by the inclination detector 26 is not continuously kept for a predetermined time (NO at Step S403) or if the inclination angle does not fall within the angle range in which the aspect ratio for the moving image can be clipped (NO at Step S404), then subsequently performed processes at Steps S421 to S423 are still-image shooting processes corresponding sequentially to the processes at Steps S121 to S123 in FIG. 11. In this case, if the switch is not operated at Step S422 (NO at Step S422), the digital camera 110 returns to Step S401. Further, the digital camera 110 returns to Step S402 after Step S423.

If the release switch 28a is operated (YES at Step S432) after the display for the moving-image shooting is performed at Step S431, then the mode switcher 14c determines the switching to the moving-image mode (Step S433). Thereafter, when the digital camera 110 is returned to the horizontal state (YES at Step S434) and if the release switch 28a is operated (YES at Step S435), the digital camera 110 starts moving-image shooting (Step S436).

If the release switch 28a is operated (YES at Step S437) after the moving-image shooting is started at Step S436, then the digital camera 110 ends the moving-image shooting (Step S438) and returns to Step S400. Meanwhile, if the release switch 28a is not operated at Step S437 (NO at Step S437) after the moving-image shooting is started at Step S436, then the digital camera 110 continues the moving-image shooting.

If the release switch 28a is not operated within a predetermined time at Step S435 (NO at Step S435) and when the operation of releasing the moving-image mode is performed on the digital camera 110 (YES at Step S439), the mode switcher 14c releases the moving-image mode to be switched to the still-image mode (Step S440), and the process returns to Step S401. The operation of releasing the moving-image mode at Step S439 represents an operation of rotating the digital camera 110 in the direction opposite to that of the switching to the moving-image mode to be inclined and then operating the release switch 28a or an operation of shaking the digital camera 110 vertically.

At Step S439, if the operation of releasing the moving-image mode is not performed (NO at Step S439) and if a predetermined time has elapsed after the digital camera 110 is returned to the horizontal state (YES at Step S441), then the digital camera 110 moves to Step S440. Meanwhile, if the operation of releasing the moving-image mode is not performed (NO at Step S439) and if the predetermined time has not elapsed after the digital camera 110 is returned to the horizontal state (NO at Step S441), then the digital camera 110 returns to Step S435.

At a step (Step S422, Step S432, Step S435, and Step S437) of determining whether the release switch 28a is operated, if the switch operation is not performed, then warning may be output so as to prompt the photographer to perform the switch operation. Here, as warning, a warning mark may be blinked on the screen of the display unit 16 or a warning may be sounded by providing a voice output unit.

As explained above, in the fourth embodiment also, only by inclining the digital camera 110 kept held by one hand, the shooting modes are switched to each other, and thus, a desired subject to be shot can be shot as a still image and a moving image without missing a photo opportunity.

It should be noted that the mode to be switched by an inclination of the digital camera 110 is not limited to the shooting modes such as the still-image mode and the moving-image mode. Mode switching other than the still-image shooting mode and the moving-image shooting mode will be exemplified below.

Figure 25A:
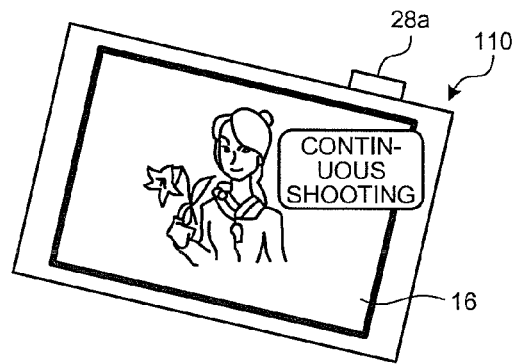
FIGS. 25A to 25C are schematics illustrating live view images on a liquid crystal display when the imaging apparatus according to a modification of the fourth embodiment of the present invention is inclined to perform mode switching.

FIG. 25A is a schematic illustrating a live view image on the display unit 16 when the digital camera 110 is inclined to switch to mode switching when the switching to a continuous shooting mode is possible. In this case, a continuous shooting mark indicating the continuous shooting mode is displayed on the display unit 16, and the mode switching is performed between the continuous shooting mode and a one-shot shooting mode by an inclination of the digital camera 110.

Figure 25B:
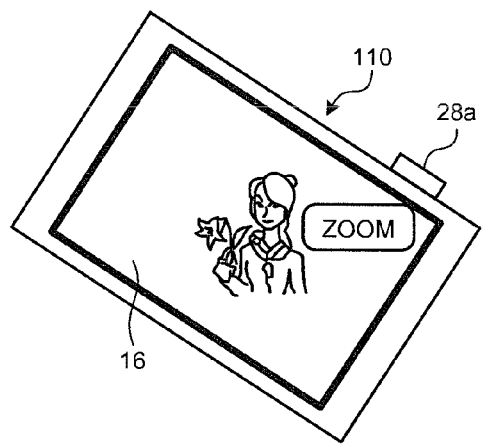

FIG. 25B is a schematic illustrating a live view image on the display unit 16 when the digital camera 110 is inclined to switch to mode switching when the switching to a zoom-up mode is possible. For example, the zoom-up mode is set at a predetermined inclination, and if the inclination angle falls within a predetermined range, the degree of zoom is increased in proportion to the inclination angle. If a specific inclination is maintained within the predetermined range for a predetermined time, the state of zoom corresponding to the inclination becomes settable. By returning the digital camera 110 to horizontal, the zoom-up is determined, and by pressing the release switch 28a, shooting with the zoom-up is performed. The release of the zoom-up mode is executed when the inclination reaches a predetermined inclination outside the range.

Obviously, the inclined state of the digital camera 110 does not allow the release switch 28a to perform the original function for release. Therefore, it may be configured to control so as to start zooming in the inclined state of the digital camera 110 and operate again the release switch 28a when it is kept inclined, and stop the zooming.

In the zoom-up mode, an inclination range is required for changing the degree of zoom. Therefore, for example, as shown in FIGS. 25A and 25B, it is preferable to have a configuration in which an inclination at which the zoom-up mode is set is started at an inclination wider than an inclination at which the continuous shooting mode is set.

Figure 25C:
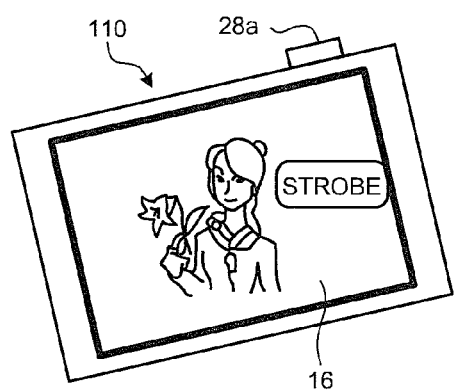

FIG. 25C is a schematic illustrating a live view image on the display unit 16 when the digital camera 110 is inclined to switch to mode switching when the switching to a strobe forced light-emitting mode is possible. As shown in FIG. 25C, if the digital camera 110 is inclined in a direction opposite to that in the case of the continuous shooting mode, then the mode switching to the strobe forced light-emitting mode is performed. It may also be configured to enable setting of a strobe forced light-emission stop mode by inclining the digital camera 110 in the above manner.

In FIGS. 25A and 25C, the inclination for the continuous shooting mode and the inclination for a strobe mode are set so that their inclination angles are same as each other but in the opposite direction, however, the inclination angles may be different from each other.

In either of FIGS. 25B and 25C, when the mode is switched to any other one, a sign indicating a type of a mode set upon switching to the mode is displayed on the display unit 16. In FIG. 25B, a sign of "zoom" appears on the screen of the display unit 16, while in FIG. 25C, a sign of "strobe" appears thereon.

Furthermore, any mode other than the continuous shooting mode, the zoom-up mode, and the strobe mode can be set. For example, a mode, set using an arrow key operation, such as a portrait, a ceremonial photograph, a landscape, a night scene, a party shot, a beach & snow, cooking, and a self portrait may be set according to an inclination of the digital camera 110.

As explained above, according to the fourth embodiment, the moving-image mode and the still-image mode are switch to each other corresponding to an attitude of the imaging apparatus. Therefore, an important subject to be shot can be shot as a still image and a moving image under optimal conditions without missing a photo opportunity. Moreover, by using the inclination operation, the photographer can carry out the operation while observing what is going on with the subject on the display unit. Therefore, the mode switching can be performed without missing a photo opportunity.

The first to the fourth embodiments are provided for the purpose of explaining the present invention, and the embodiments do not therefore limit the present invention. Thus, it goes without saying that all the portions subjected to modification and alteration within the technological range of the present invention are also included in the present invention.

For example, in the first to the fourth embodiments, the digital camera is applied as the imaging apparatus, however, the imaging apparatus as a target of the present invention is not limited to the digital camera, and thus, for example, a mobile phone having the function of the digital camera and a mobile tool with the digital camera such as a notebook-sized personal computer are also included in the imaging apparatus according to the present invention.

Furthermore, the selection/reproduction process according to the present invention can be applied to a display unit for reproduction only such as a photo storage viewer and a digital photo frame, and also applied to an image/audio reproduction unit that reproduces a music together with an image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an imaging unit that includes
      a shooting lens for collecting an image of subject to be shot; and
      an imaging element that forms the image collected by the shooting lens and generates image data through photoelectric conversion of formed image;
   an inclination detector that detects an inclination of the imaging apparatus from a predetermined first orientation, through a rotation around a shooting optical axis of the shooting lens; and
   a control unit that
      (1) operates the imaging apparatus in a first operating mode, with the imaging apparatus being in a first orientation,
      (2) changes an operating mode of the imaging apparatus from the first operating mode to a second operating mode responsive to (i) a determination that the imaging apparatus is inclined at least a predetermined angle from the first orientation, and (ii) a further determination that the imaging apparatus is returned to the first orientation, and
      (3) operates the imaging apparatus in the second operating mode, with the imaging apparatus being in the first orientation.

2. The imaging apparatus according to claim 1, further comprising a display unit that displays an image contained in the image data generated by the imaging unit, wherein
   the control unit causes the display unit to display the image data corresponding to the second operating mode after being changed from the first operating mode to the second operating mode.

3. The imaging apparatus according to claim 2, wherein
   the display unit displays an image shot by the imaging unit with an aspect ratio corresponding to the second operating mode.

4. The imaging apparatus according to claim 1, wherein
   the determination that the imaging apparatus is inclined at least a predetermined angle from the first orientation includes determining that an angle $\theta$ of inclination from the first orientation exists, the angle being an angle of the inclination detected by the inclination detector, and wherein the first orientation falls within a predetermined angle range including $\theta=0$ degrees.

5. The imaging apparatus according to claim 4, wherein the each of the first and second operating modes is selected from a group of operating modes consisting of (A) a simultaneous shooting mode used to simultaneously shoot a still image and a moving image, (B) a still-image mode used to shoot a still image, and (C) a moving-image mode used to shoot a moving image.

6. The imaging apparatus according to claim 5, wherein the first operating mode is selected from a group consisting of (A) the still-image mode and (B) the moving-image mode and wherein the second operating mode includes a lower-order mode.

7. The imaging apparatus according to claim 6, wherein the determination that the imaging apparatus is inclined at least a predetermined angle from the first orientation includes determining that an angle θ of inclination from the first orientation exists, the angle being an angle of the inclination detected by the inclination detector, and wherein the first orientation falls within a predetermined angle range including θ=0 degrees.

8. The imaging apparatus according to claim 7, further comprising an auxiliary light-emitting unit that emits an auxiliary light irradiating a subject to be shot, wherein
the lower-order mode includes at least two modes among a forced light-emitting mode of the auxiliary light-emitting unit, a non-light-emitting mode of the auxiliary light-emitting unit, a closeup shooting mode, and a distant-view shooting mode.

9. The imaging apparatus according to claim 6, further comprising a release switch which is operated to input a signal instructing shooting by the imaging unit, wherein
the control unit changes the imaging apparatus operating mode to the first operating mode immediately after the power for the imaging apparatus is turned on when the release switch is not operated for a determined time after the operating mode is changed to the lower-order mode.

10. The imaging apparatus according to claim 9, wherein the operating mode immediately after the power for the imaging apparatus is tuned on is the simultaneous shooting mode.

11. The imaging apparatus according to claim 6, further comprising an auxiliary light-emitting unit that emits an auxiliary light irradiating a subject to be shot, wherein
the lower-order mode includes at least two modes among a forced light-emitting mode of the auxiliary light-emitting unit, a non-light-emitting mode of the auxiliary light-emitting unit, a closeup shooting mode, and a distant-view shooting mode.

12. The imaging apparatus according to claim 1, further comprising a release switch which is operated to input a signal instructing shooting by the imaging unit, wherein
the control unit changes the operating mode only if it is further determined that the release switch is operated for input while the imaging apparatus is inclined at least a predetermined angle from the first orientation.

13. The imaging apparatus according to claim 12, wherein the first operating mode is a still-image mode used to shoot a still image, and wherein the second operating mode is a moving-image mode used to shoot a moving image.

14. The imaging apparatus according to claim 13, wherein the control unit causes the imaging unit to start shooting according to the second operating mode responsive to a determination that the imaging apparatus is returned to the first orientation in a state in which the release switch remains pressed continuously from before the control unit changes the imaging apparatus operation from the first operating mode to the second operating mode.

15. The imaging apparatus according to claim 13, wherein the control unit causes, after the imaging apparatus operation is changed to the second operating mode, the imaging unit to start shooting according to the second operating mode responsive to a determination that the imaging apparatus is returned to the first orientation and the release switch is again operated for input.

16. The imaging apparatus according to claim 2, further comprising a recording unit that records the image data generated by the imaging unit in association with shooting date and time, wherein
the display unit can switch, for display, between a first thumbnail composed of typical scenes of moving images arranged in the order of the shooting date and time and a second thumbnail composed of reduced images of a plurality of still images arranged in the order of the shooting date and time, and
the control unit causes the display unit to display an image selected from the first or the second thumbnail, and then to display either one of the first and the second thumbnail including an image shot in the same period of time as that of selected image according to the inclination of the imaging apparatus detected by the inclination detector.

17. The imaging apparatus according to claim 1, wherein the operating mode includes an image capture control operating mode.

18. The imaging apparatus according to claim 1, wherein the act of changing from the first operating mode to the second operating mode is selected from a group consisting of (A) changing from a still image shooting mode to a moving image shooting mode, (B) changing from a moving image shooting mode to a still image shooting mode, (C) changing from a full image display mode to a clipped image display mode, (D) changing from a clipped image display mode to a full image display mode, (E) changing from a strobe on mode to a strobe off mode, (F) changing from a strobe off mode to a strobe on mode, (G) changing from a thumbnail display mode in which image thumbnails have a first aspect ratio to a thumbnail display mode in which image thumbnails have a second aspect ratio which is different from the first aspect ratio, and (H) changing from a mode in which pressing a button of the imaging apparatus invokes a first function to a mode in which pressing the button of the imaging apparatus invokes a second function which is different from the first function.

19. The imaging apparatus according to claim 1, wherein the first orientation is a horizontal orientation.

20. The imaging apparatus according to claim 1, wherein the control unit changes an operating mode of the imaging apparatus from the first operating mode to a second operating mode only when it is determined that the imaging apparatus is inclined at least a predetermined angle from the first orientation for at least a predetermined time.

21. The imaging apparatus according to claim 1 further comprising a release switch, wherein the first orientation is an orientation in which the release switch is oriented on a top of the imaging apparatus.

* * * * *